United States Patent
Masuda et al.

(10) Patent No.: US 10,394,307 B2
(45) Date of Patent: Aug. 27, 2019

(54) INFORMATION PROCESSING APPARATUS, INFORMATION PROCESSING METHOD, AND PROGRAM

(71) Applicant: SONY CORPORATION, Minato-ku (JP)

(72) Inventors: Takeshi Masuda, Nagano (JP); Toshimasa Tsuchida, Nagano (JP); Takahiro Imai, Nagano (JP); Yoshiyuki Tanaka, Nagano (JP); Kiyotaka Akasaka, Nagano (JP); Kenichi Onishi, Nagano (JP); Norifumi Yoshida, Nagano (JP)

(73) Assignee: SONY CORPORATION, Tokyo (JP)

(*) Notice: Subject to any disclaimer, the term of this patent is extended or adjusted under 35 U.S.C. 154(b) by 64 days.

(21) Appl. No.: 14/395,205

(22) PCT Filed: Mar. 14, 2013

(86) PCT No.: PCT/JP2013/057225
§ 371 (c)(1),
(2) Date: Oct. 17, 2014

(87) PCT Pub. No.: WO2013/161425
PCT Pub. Date: Oct. 31, 2013

(65) Prior Publication Data
US 2015/0134990 A1   May 14, 2015

(30) Foreign Application Priority Data
Apr. 27, 2012 (JP) .................. 2012-103444

(51) Int. Cl.
G06F 1/26 (2006.01)
G06F 1/3287 (2019.01)
(Continued)

(52) U.S. Cl.
CPC ............ *G06F 1/3287* (2013.01); *G06F 1/263* (2013.01); *G06F 1/3206* (2013.01);
(Continued)

(58) Field of Classification Search
None
See application file for complete search history.

(56) References Cited

U.S. PATENT DOCUMENTS

2002/0091978 A1* 7/2002 Higashida ............. G06F 1/3206
714/726
2005/0022039 A1   1/2005 Inui et al.
(Continued)

FOREIGN PATENT DOCUMENTS

JP   2001-167038 A   6/2001
JP   2005-4544 A    1/2005
(Continued)

OTHER PUBLICATIONS

Extended European Search Report dated Nov. 23, 2015 in Patent Application No. 13781008.1.
(Continued)

*Primary Examiner* — Paul Yen
(74) *Attorney, Agent, or Firm* — Xsensus, LLP

(57) ABSTRACT

Provided is an information processing apparatus including a processor configured to control a system of the information processing apparatus, a power source controller configured to perform control of power supply to the system and to turn off a power source of the power source controller in standby mode in which a power source of the processor is turned off, a memory configured to store information in standby mode, and a power supply unit configured to perform power supply to the memory in standby mode.

7 Claims, 35 Drawing Sheets

(51) Int. Cl.
*G06F 1/3206* (2019.01)
*G06F 1/3234* (2019.01)

(52) U.S. Cl.
CPC ............ *G06F 1/3275* (2013.01); *Y02D 10/14* (2018.01); *Y02D 10/171* (2018.01); *Y02D 50/20* (2018.01)

(56) References Cited

U.S. PATENT DOCUMENTS

| | | | | |
|---|---|---|---|---|
| 2005/0225177 | A1* | 10/2005 | Jacobs | G06F 1/26 307/82 |
| 2006/0224907 | A1* | 10/2006 | Feldman | G06F 1/30 713/300 |
| 2011/0093727 | A1 | 4/2011 | Hwang | |
| 2011/0161686 | A1* | 6/2011 | Kumagaya | G06F 1/26 713/300 |
| 2012/0200397 | A1* | 8/2012 | Nakajima | G08C 23/04 340/12.5 |
| 2013/0290757 | A1* | 10/2013 | Barlow | G06F 1/3287 713/323 |

FOREIGN PATENT DOCUMENTS

| | | |
|---|---|---|
| JP | 2006-254117 A | 9/2006 |
| JP | 2011-90423 A | 5/2011 |
| JP | 2011-232901 A | 11/2011 |

OTHER PUBLICATIONS

Combined Chinese Office Action and Search Report dated May 26, 2016 in Patent Application No. 201380020884.0 (with English language translation).

International Search Report dated Apr. 16, 2013 in PCT/JP2013/057225.

Office Action dated Aug. 18, 2015 in Japanese Patent Application No. 2014-512412.

* cited by examiner

|  | PC OF FIG. 1 | FIRST EMBODIMENT |
|---|---|---|
| System | 200mW | 200mW |
| EC | 100mW | 0mW |
| Total | 300mW | 200mW |
| Battery Life | 10Day | 15Day |

- WHEN RTC WAKE IS SET, BIOS SETS DATE AND TIME FOR EC TO WAKE (DATE AND TIME SIMILAR TO RTC WAKE)
- EC SETS ITS OWN ALARM TIMER TO WAKE SEVERAL SECONDS BEFORE SET DATE AND TIME

- SYSTEM TRANSITIONS TO S5
  - STATE OF SUPPLYING POWER ONLY TO RTC CIRCUIT AND TIMER IN EC

- RETURNED EC SUPPLIES POWER TO PCH
  - AT THIS TIME, RTC TIMER IS NOT EXPIRED
  - ELECTRICAL RTC WAKE-ENABLED ENVIRONMENT IS PREPARED

- RTC TIMER IN PCH IS EXPIRED AFTER SEVERAL SECONDS, AND RTC WAKE INTERRUPT OCCURS

- AFTER RTC WAKE OCCURS, SYSTEM TRANSITIONS TO S0 THROUGH NORMAL RETURN PATH

- EC MANAGES POWER SOURCE OF MAIN MEMORY
- EC SETS DATE AND TIME AT WHICH POWER SOURCE OF MEMORY IS TURNED OFF IN ITS OWN ALARM TIMER
  - AT THIS TIME, IT IS RECORDED TO TURN OFF MEMORY POWER SOURCE AT TIME OF NEXT WAKEUP

- WHILE POWER SOURCE OF EC/CPU IS TURNED OFF, ALARM TIMER IS EXPIRED AND POWER SOURCE OF EC IS TURNED ON

FIG. 20

| State | Default | Charge mode |
|---|---|---|
| S0 | SDP | CDP |
| S3 | SDP | DCP |
| S4 | off | DCP |
| S5 | off | DCP |

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

In an information processing apparatus such as personal computers (PCs), states including suspend (standby) and hibernation in addition to a normal power-on state are typically set. For example, Patent Literature 1 listed below discloses a technology that enables a timer to wake when an EC is turned off in S4 or S5 state.

Furthermore, Patent Literature 2 discloses a method of reducing the amount of data to be read or written in hibernation performed by the BIOS.

CITATION LIST

Patent Literature

| Patent Literature 1: | JP 2011-204168A |
| Patent Literature 2: | JP 2001-92627A |

SUMMARY OF INVENTION

Technical Problem

In the state generally referred to as standby, it is necessary to supply power to a memory in a state where a CPU is powered off. However, in order to supply power to a memory, it is necessary to wake up an EC that performs control of the power source of the entire system. Thus, the reduction in power consumption of an EC has been a problem in lowering power consumption.

Therefore, it is desirable to reduce the power consumption in standby mode.

Solution to Problem

According to the present disclosure, there is provided an information processing apparatus including a processor configured to control a system of the information processing apparatus, a power source controller configured to perform control of power supply to the system and to turn off a power source of the power source controller in standby mode in which a power source of the processor is turned off, a memory configured to store information in standby mode, and a power supply unit configured to perform power supply to the memory in standby mode.

The power supply unit may include a GPIO expander.

The power source supply unit may include a latch circuit.

The power source controller may include a region for an operation in a first power source system and a region for an operation in a second power source system, and the region for an operation in the second power source system is turned off in standby mode. The power supply unit may operate in the first power system in standby mode.

According to the present disclosure, there is provided an information processing control method including turning off a power source of a power source controller in standby mode in which a power source of a processor is turned off, the power source controller being configured to perform control of power supply to a system of an information processing apparatus, the processor being configured to control the system, and performing power supply to a memory by a power supply unit in standby mode, the memory being configured to store information, the power supply unit being provided separately from the power source controller.

According to the present disclosure, there is provided a program for causing a computer to function as means for turning off a power source of a power source controller in standby mode in which a power source of a processor is turned off, the power source controller being configured to perform control of power supply to a system of an information processing apparatus, the processor being configured to control the system, and means for causing a power supply unit provided separately from the power source controller to perform power supply to a memory for storing information in standby mode.

Advantageous Effects of Invention

According to one or more of embodiments of the present disclosure, it is possible to reduce the power consumption in standby mode.

BRIEF DESCRIPTION OF DRAWINGS

FIG. 20 is a schematic diagram illustrating implementation specification of each state according to a third embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description is made in the following order.
1. Technology as Basis
2. First Embodiment
2.1. Exemplary Overall Configuration of Apparatus
2.2. Specific Configuration of Apparatus
3. Second Embodiment
3.1. Operation of Second Embodiment
3.2. Power ON/OFF Control of Devices by EC
3.3. Exemplary Configuration of Second Embodiment
4. Third Embodiment
4.1. Overview of USB Charging
4.2. Measures against Data Loss as Basis
4.3. Measures against Data Loss according to Third Embodiment
4.4. Hybrid Sleep Function
4.5. Battery Sleep Disable
4.6. Processing of Third Embodiment
5. Fourth Embodiment

1. Technology as Basis

In recent years, mobile devices called a smartphone or tablet have been used in addition to personal computers (PCs) as a terminal capable of connecting to the Internet via email or through the Web.

These mobile devices have a relatively lower processing capacity than PCs, but they have a lighter weight and longer battery duration than PCs, and are suitable for carrying. In addition, the mobile device is configured to be generally placed in standby mode when the user does not use the device and to be returned immediately from the standby mode when the user wants to use the device.

Figure 1:
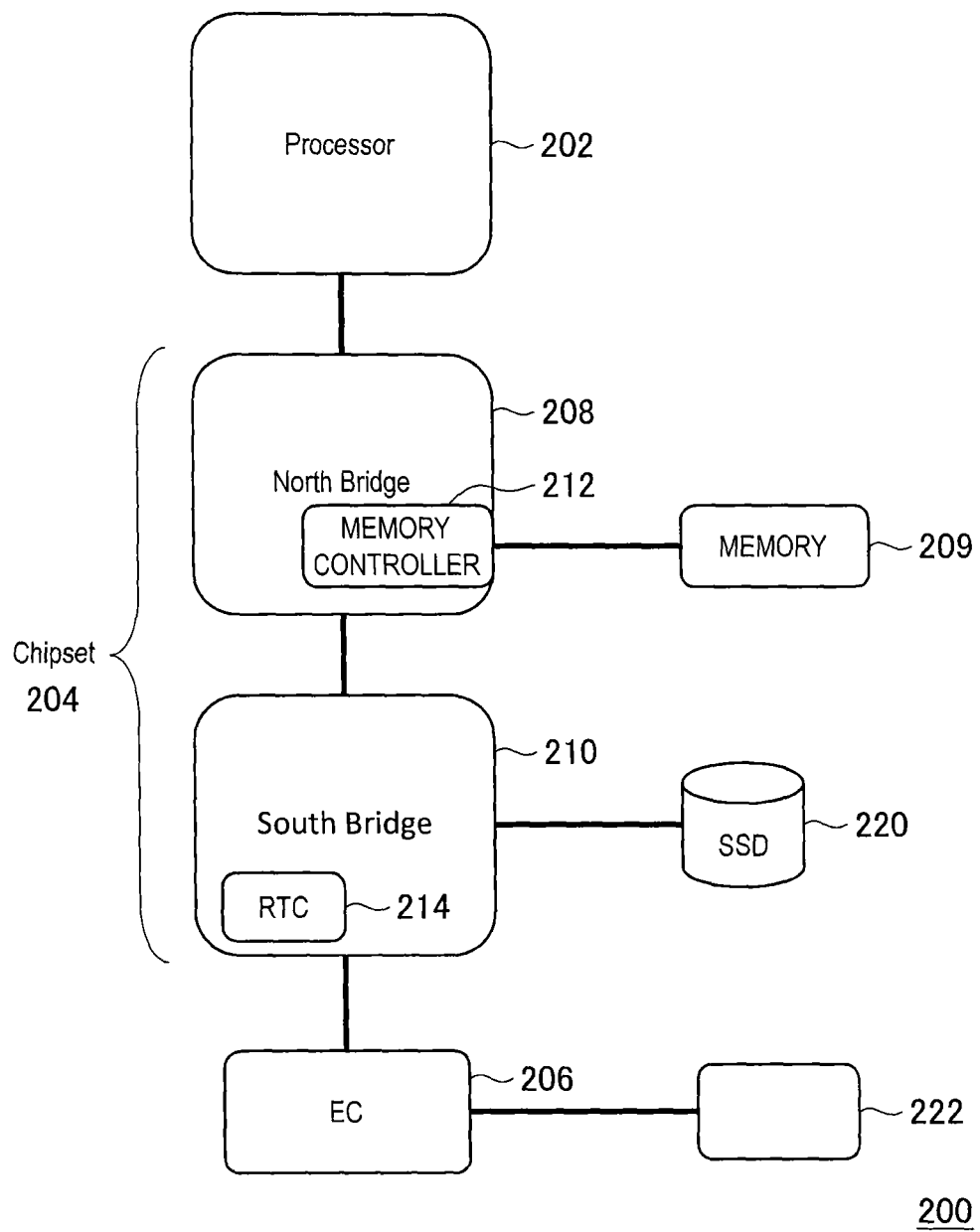
FIG. 1 is a schematic diagram illustrating the configuration of a general PC.

On the other hand, PCs, when not in use, are generally placed in shutdown (power off) state, but they have solutions including suspend, hibernation, and Instant-On. FIG. 1 is a schematic diagram illustrating the configuration of a general PC 100. As illustrated in FIG. 1, the PC 200 is configured to include a processor (or central processing unit (CPU)) 202, a chipset 204, an embedded controller (EC) 206, a memory (DRAM) 209, a liquid crystal display (LCD, not illustrated in FIG. 1), a storage device 220 such as a hard disk drive (HDD), and a battery 222.

The chipset 204 is a set of chips that manages the transfer of data between the CPU 202 and various devices, such as the storage device 220 and an LCD, in the information processing apparatus 200. As illustrated in FIG. 1, the chipset 204 is composed of a northbridge 208 and a south bridge 210. The northbridge 208 includes a memory controller 212 used to control the memory 209. In addition, the south bridge 210 includes a real-time clock (RTC) 214 that is a dedicated chip for a clock. The RTC 214, unlike other chips on the motherboard, operates by receiving power supplied from its built-in battery even while the power source is turned off (power is supplied from an external power source while the power source is turned on). The operating system (OS) obtains the date and time from the RTC 214 at startup, and then counts the date and time all on its own. The EC 206 is used to perform the control of power supply to the PC 200 and is composed of, for example, large-scale integration (LSI) circuits.

Each of states including suspend, hibernation, Instant-On, and EC off will be described below.

<Suspend>

Suspend is also referred to as S3 (state) defined in the advanced configuration and power interface (ACPI) specification. In addition, suspend is also referred to as standby or sleep. Suspend is a standby state that can reduce the power consumption of the entire system and return to its operating state at a high speed by turning off or stopping devices including the processor 202, the storage device 220, and the LCD while maintaining the data in the memory 209. In a suspend mode, the data in the state where OS is started is held in the memory 209, and thus the OS is not restarted upon returning and returns to the state as it was before entering suspend mode.

In suspend mode, the power is supplied to the memory 209 to maintain the data in the memory 209. During suspend mode, the memory 209 is placed in the state referred to as self-refresh mode. The self-fresh is a mode that suppresses power consumption of devices to a low level by deactivating the clock and performs a refresh operation automatically using an internal refresh counter. The self-refresh is necessary to hold data but is effective when there is no access to a device for a long time.

In suspend mode, the power consumption is relatively large compared to the state where the entire system is turned off (S5 defined in the ACPI specification). Additionally, in suspend mode, if power supply is cut off, such as when a power failure occurs or when there is no remaining battery capacity, data in the memory 209 will be lost and the data may not be returned.

<Hibernation (S4, Also Called Pause State>

Hibernation is a function of storing (saving) the contents of memory 209 in the storage device 220 such as an HDD immediately before the system is powered off, restoring the contents that stored in the storage device 220 as the contents of the memory 209 at the next wakeup, and returning its state. The hibernation is also referred to as S4 in the ACPI specification.

In hibernation mode, the system can be completely powered off, and thus this has advantages of low power consumption compared to suspend mode. On the other hand, in hibernation mode, the contents of the memory 209 are saved and restored in the storage device 220, thus its transition and returning are relatively time-consuming.

In order to shorten the time necessary for transition and returning to and from hibernation mode, it is effective to reduce the amount of data to be read from and written to the storage device 220 as much as possible. As mentioned above, the method of reducing the amount of data to be read and written in hibernation performed by the BIOS is disclosed in Patent Literature 2.

<Instant-On>

Instant-On is an OS which has a limited function but can start in a short period of time and is separately prepared from a normal OS that can use all the functions of the system. In response to an instruction from the user, a normal OS or Instant-On is selected as the OS to be started.

The Instant-On uses a different OS from a normal OS and thus it is necessary to restart to switch OS. In addition, it is not possible to continue to work across these OSs.

<EC Off>

The EC 206 is responsible for the management of the power source state of the system. The state where the EC 206 is turned off corresponds to S5 defined in the ACPI specification and is the state where the entire system is turned off. As described above, the suspend mode (S3, standby) is the state different from a power off state (S5), and in this mode, it is necessary to maintain the power supply to the memory 209 of the system. For this reason, in the case of the general PC 200 illustrated in FIG. 1, it is not possible to turn off the EC 206 during suspend mode.

<Hybrid Sleep>

It is a combination of S3 (standby) and hibernation, and a hibernation image (Hib image) is created on the storage device 220 at the same time as the transition to standby mode. The transition time to create a hibernation image is long, compared to standby mode, but the returning to S0 is performed in shorter time because a direct transition to standby mode is performed. In addition, unlike standby mode, it is possible to return through any hibernation image on the storage device 220 even when power is down. The hybrid sleep is introduced as a function of Windows Vista (registered trademark).

As described above, in the PC 200, returning from the waiting mode is implemented by solutions such as suspend, hibernation, and Instant-On. In this regard, as described above, it is incapable of turning off the EC 206 in suspend mode, and there is a problem of increasing power consumption. In addition, there is a problem that the relatively time-consuming transition and returning are necessary in hibernation mode.

Thus, there will be described hereinafter each of embodiments according to the present disclosure, especially an embodiment related to the reduction of power consumption of the entire system during suspend mode and an embodiment related to the reduction of transition time in hibernation.

2. First Embodiment

[2.1. Exemplary Overall Configuration of Apparatus]

The first embodiment relates to a technology that turns off the power source of the EC to reduce electric power in suspend (standby) mode. Turning off the power source of the EC allows power in standby mode to be significantly reduced. The power supply to the memory employs a GPIO expander that is controllable by the EC. The output level of the memory can be maintained during suspend mode by collecting signals that are necessary to be controlled in the GPIO expander and supplying power only to the GPIO expander.

Figure 2:
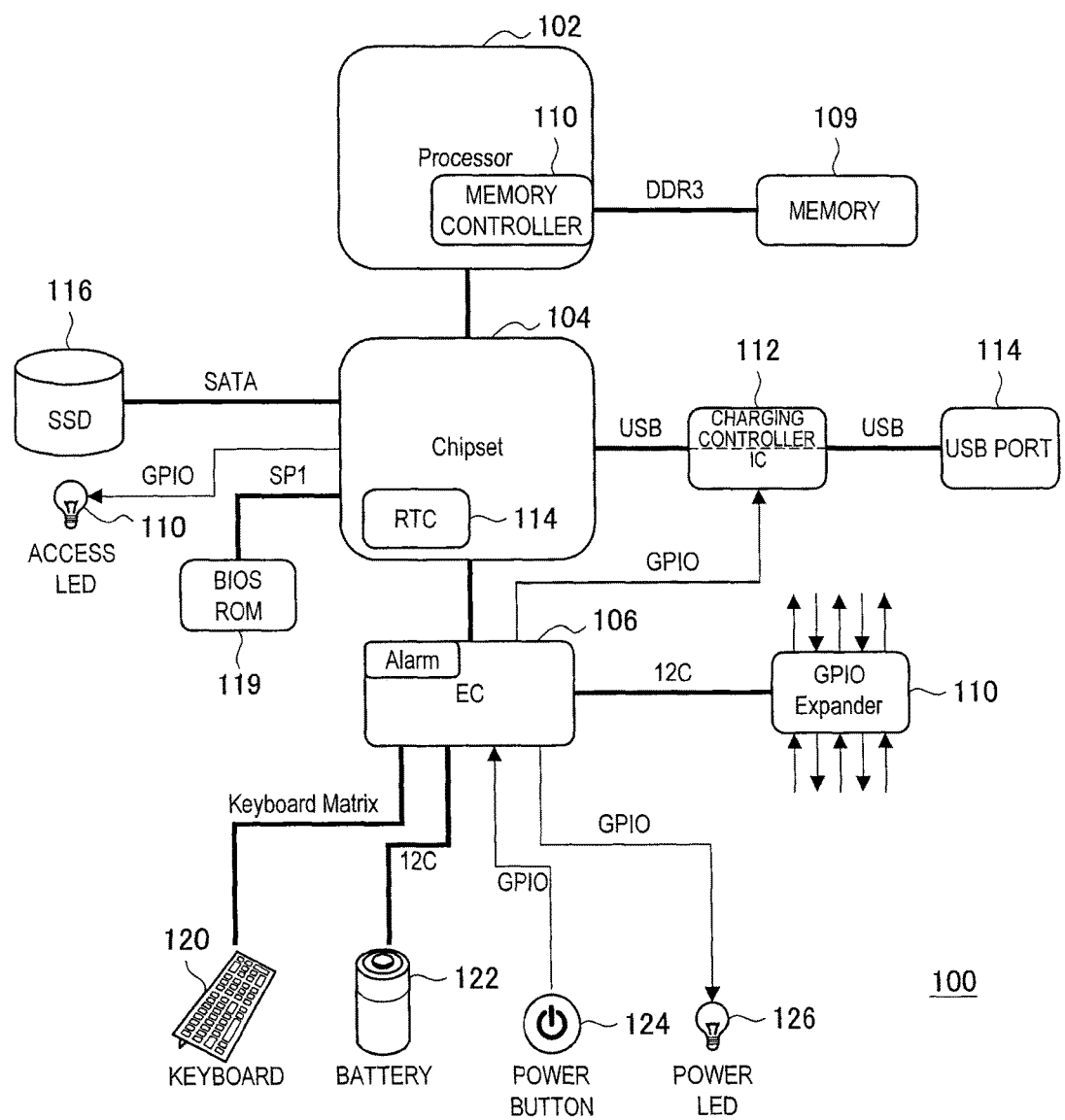
FIG. 2 is a schematic diagram illustrating the entire configuration of an information processing apparatus according to each embodiment.

Referring first to FIG. 2, the schematic configuration of the information processing apparatus 100 according to the first embodiment of the present disclosure is described. FIG. 2 is a schematic diagram illustrating the entire configuration of the information processing apparatus 100 according to each embodiment described below. The information processing apparatus 100 includes, for example, a notebook-type personal computer (PC), but it is not limited thereto. As illustrated in FIG. 2, the information processing apparatus 100 is configured to include a processor 102, a chipset (platform controller hub (PCH)) 104, an EC 106, a memory 109, a GPIO expander IC 110, a charging controller IC 112, a USB port 114, a storage device (for example, SSD or HDD) 116, an access LED 118, and a BIOS ROM 119. The information processing apparatus 100 is also configured to include a keyboard 120, a battery 122, a power button 124, and a power LED 126.

In the information processing apparatus 100 according to the present embodiment, unlike the PC 200 of FIG. 1, the chipset 104 may not be composed of the northbridge 208 and the south bridge 210 but the processor 102 has the function of the northbridge 208. In other words, the northbridge 208 of FIG. 1 is incorporated into the processor 102. Thus, the processor 102 is configured to include a memory controller 110 that is used to control the memory 109. The chipset 104 is mainly composed of the south bridge 210 of FIG. 1. The chipset 104 is configured to include a real-time clock (RTC) 114 that is a dedicated chip for a clock. In addition, the EC 106 is configured to include an alarm timer 107.

[2.2. Specific Configuration of Apparatus]

Figure 3:
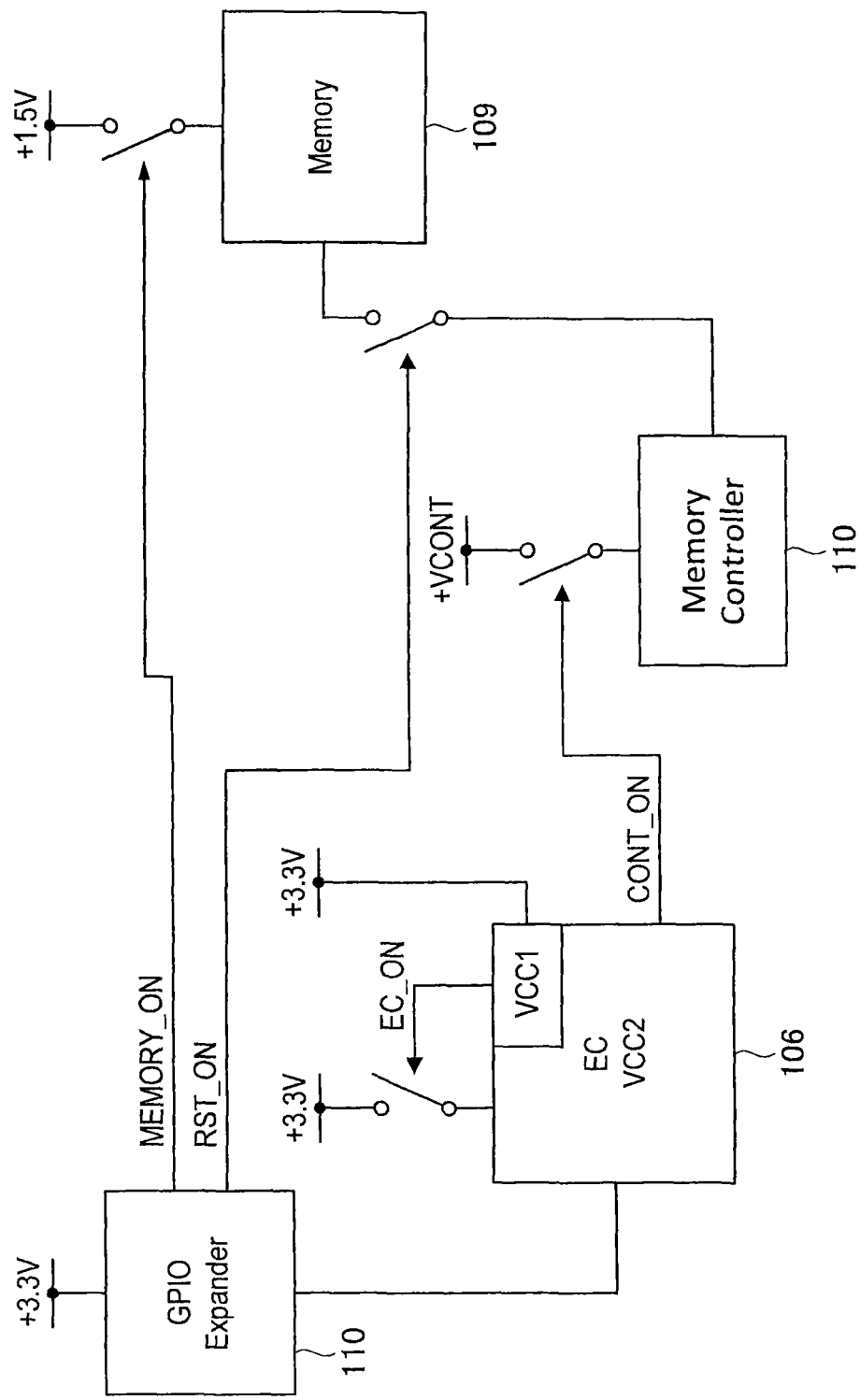
FIG. 3 is a schematic diagram illustrating the specific configuration of the information processing apparatus according to a first embodiment.

FIG. 3 is a schematic diagram illustrating the specific configuration of the information processing apparatus 100 according to the first embodiment. FIG. 3 mainly illustrates the memory 109 and a component for supplying power to the memory 109.

The EC 106 operates with two power source systems (VCC1/VCC2). The GPIO expander 110 uses power source corresponding to the power source VCC1 of the EC 106. In suspend mode (S3), in order to retain data in the memory 109, the output level of two signals (MEMORY_ON and RST_ON) which are supplied to the memory 109 is kept. The MEMORY_ON is a signal that is used to control the power supply to the memory 109, and the RST_ON/EC_ON is a signal that is used to control a reset signal. These signals are supplied from a VCC1 operation portion of the EC 106 or the GPIO expander 110.

In the present embodiment, in suspend mode (S3), the power source VCC2 of the EC 106 is turned off. This causes most of functions of the EC 106 to be turned off. On the other hand, the power source VCC1 of the EC 106 is not turned off even in suspend mode, and power is supplied to the GPIO expander 110 even in suspend mode.

As a result, in the state where most of functions of the EC 106 are turned off, the GPIO expander 110 can be turned on and continue to transmit signals to the memory 109. In suspend mode, it is possible to reduce significantly the power consumption by turning off most of functions of the EC 106.

In the example illustrated in FIG. 3, the power source VCC1 is provided to the EC 106, but the power source VCC1 may be provided separately from the EC 106. This allows the EC 106 to be turned off completely in suspend mode.

Furthermore, in the configuration illustrated in FIG. 3, a power source +VCONT of the memory controller 110 is powered off during standby mode, and thus CONT_ON enabled by the power source VCC2 of the EC 106 is not necessary to keep its output level.

As described above, in the present embodiment, the power source of the EC 106, which performs the control of power supply to the system, is turned off at the time of standby in which the power source of the processor 102 that controls the system is turned off. In addition, at the time of standby, the GPIO expander 110 provided separately from the EC 106 supplies power to the memory 109 that stores information. The configuration that implements this process can be composed of hardware (circuitry) or can be composed of a central processing unit such as CPU and a program for causing the central processing unit to perform the function.

Figure 4:
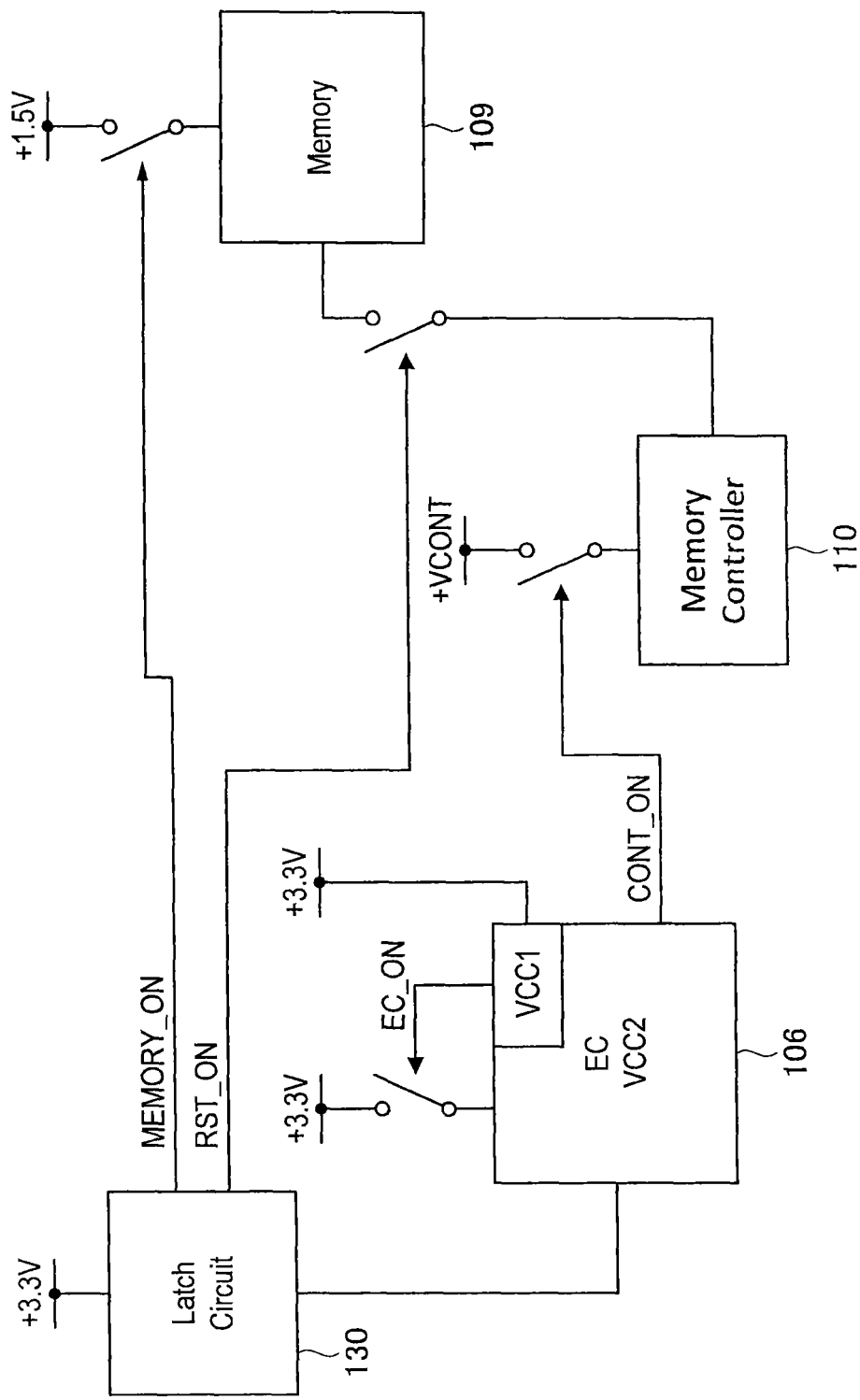
FIG. 4 is a schematic diagram illustrating another example of the specific configuration of the information processing apparatus according to the first embodiment.

FIG. 4 is a schematic diagram illustrating another example of the specific configuration of the information processing apparatus 100 according to the first embodiment. In the example illustrated in FIG. 4, an external latch circuit 130 is provided instead of the GPIO expander 110. The external latch circuit 130 uses the power source corresponding to the power source VCC1 of the EC 106 in suspend mode. Even in the configuration illustrated in FIG. 4, similarly to the configuration illustrated in FIG. 3, the power source VCC2 of the EC 106 can be turned off in suspend mode, and thus it is possible to reduce significantly the power consumption in suspend mode.

Figures 5, 6:
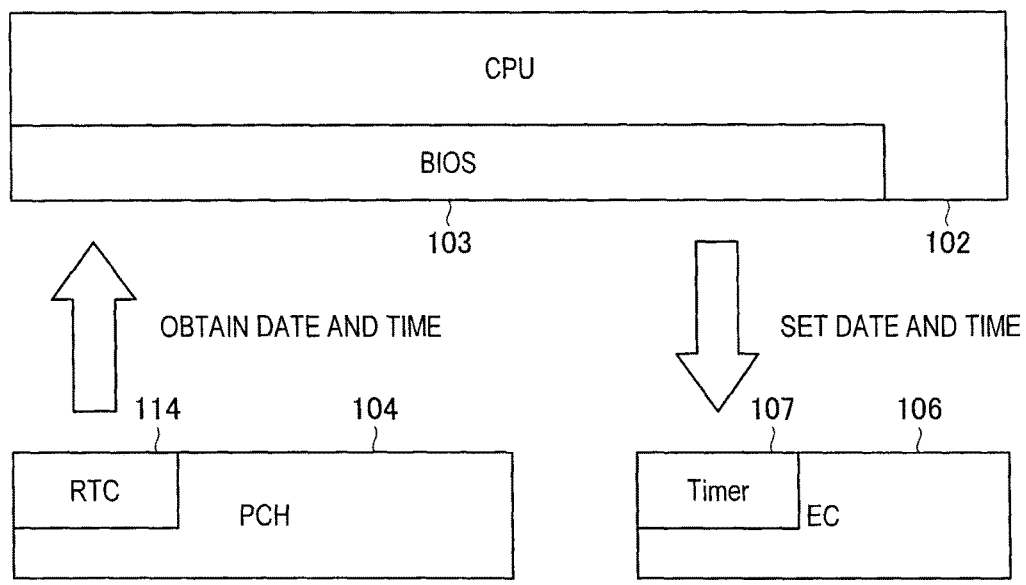
FIG. 5 is a schematic diagram for describing the advantageous effects of the first embodiment.
FIG. 6 is a schematic diagram illustrating an example of return from power off state by an RTC.

FIG. 5 is a schematic diagram for describing an example of advantageous effects of the first embodiment. As illustrated in FIG. 5, in the PC 200 of FIG. 1, the power consumption of the EC 206 in suspend (standby) mode is 200 [mW], while the power consumption of the EC 106 in suspend mode according to the configuration of the first embodiment can be reduced to 0 [mW]. Accordingly, the total power consumption of the information processing apparatus 100 can be reduced to 200 [mW], and thus it is possible to reduce the power consumption by 100 [mW] compared to the total power consumption (300 [mW]) of the PC 200 of FIG. 1. As a result, the life of the battery 122 after charging can last for 15 days, which can be extended by 1.5 times compared to 10 days of the PC 200 of FIG. 1.

According to the first embodiment as described above, the power consumption in suspend mode can be significantly reduced by collecting signals for maintaining the memory 109 in the GPIO expander 110 in suspend mode and turning off (OFF) the power source of the EC 106 in suspend mode. Thus, it is possible to extend considerably the duration of the battery 122.

3. Second Embodiment

3.1. Operation of Second Embodiment

Next, a second embodiment of the present disclosure is described. The second embodiment relates to the technology that implements a wake time with high accuracy when the power source of the EC and the chipset is turned off in suspend mode.

The chipset 104 is configured to include the RTC 114. Turning off the power source of the chipset 104 (cutting off the power source to resume) causes the function of the RTC 114 provided in the chipset (PCH) 104 to be unable to use. Thus, the power consumption can be reduced by turning off the power source of the chipset 104, but there is a disadvantage that this comes at the expense of the function of the RTC 214.

In addition, when the EC 106 is responsible for managing the power source of devices, it is necessary to be set to turn on the power source of the EC 106, but if the EC 106 is turned off, the power source management is unable to be performed. However, if the power source of the EC 106 is set to be turned on, then the power consumption increases.

On the other hand, the information processing apparatus 100 has an RTC wake function. The RTC wake is a function in which the chipset 104 is self-powered at a given time. The RTC wake function is set by an instruction of the user or an OS and is enabled by BIOS. The use of the RTC wake function allows the processor 102 to be turned on only for a necessary period of time. However, in order to use the RTC wake function, it is necessary to turn on the power source of the chipset 104. BIOS is a group of programs that are used to control the processor 102, the EC 106 connected to the chipset 104, and peripheral devices such as the storage device 116, and provides a basic input/output system for these devices for an OS or application software. The BIOS is stored in the BIOS ROM 119.

In the second embodiment, when the RTC wake is set by an OS, the BIOS performs the same setting on the EC 106. The EC 106 turns on the power source of the chipset 104 a predetermined time (for example, several seconds) before the date and time that are set by the RTC wake. In the chipset 104, the RTC wake-up interrupt occurs at the set date and time and the system wakes up. According to this configuration, it is possible to turn on the EC 106 and the chipset 104 only for a necessary period of time, and thus a significant reduction in the power consumption can be obtained.

An example of return from a power off state by the RTC according to the present embodiment is described below with reference to FIGS. 6 to 11. The configuration that implements this process can be composed of hardware (circuitry) or by a central processing unit such as CPU and a program for causing the central processing unit to perform the function. The following description is made in connection with an example of return from S5 (shutdown), but this is similarly applicable to cases of return from other power off states. FIG. 6 is a schematic diagram illustrating signals exchanged among the processor (CPU) 102, the chipset 104, and the EC 106 and the power on/off state accordingly. In FIGS. 6 to 11, a region marked with dots indicates a power off state, and a region not marked with dots indicates a power on state.

As described above, the chipset 104 includes the RTC 114. In addition, the EC 106 includes its own timer 107.

When the RTC wake is set in the chipset 104, the RTC wake interrupt occurs in the chipset 104 at the set date and time, the power is supplied to the processor 102, and the system wakes up.

As illustrated in FIG. 6, when the RTC wake is set, the BIOS 103, which operates on the processor 102, obtains information related to the date and time when it wakes up by the RTC wake from the chipset 104. Then, the BIOS 103 sets the date and time for the EC 106 to wake (date and time similar to RTC wake) based on the information obtained from the chipset 104. The EC 106 sets its own timer 107 (an alarm timer) so that it wakes up at a predetermined time before the set date and time. The predetermined time is set to the time at which the wake-up of the EC 106 can definitely precede the RTC wake depending on the accuracy of the timer 107 of the EC 106 or the margin until the RTC wake starts up. The predetermined time can be set to any value including one second, five seconds, one minute, and five minutes.

Figure 7:
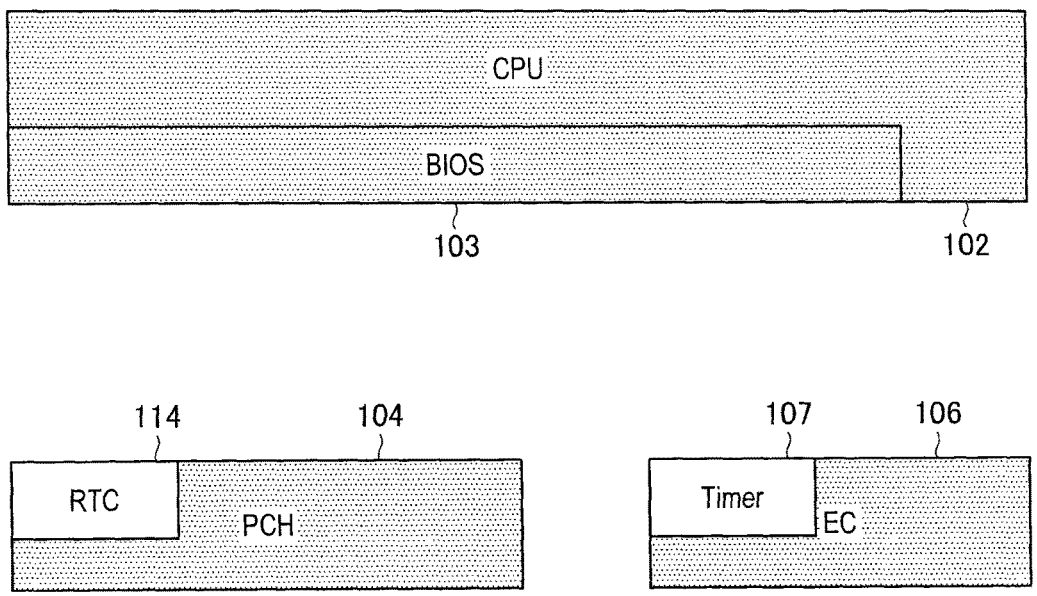
FIG. 7 is a schematic diagram illustrating an example of return from power off state by an RTC.

As illustrated in FIG. 7, when the system changes the mode to S5 in the state where the RTC wake is set, the power sources of the processor 102, the chipset 104, and the EC 106 are turned off, and the power is supplied only to the RTC 114 and the timer 107 in the EC 106.

Figure 8:
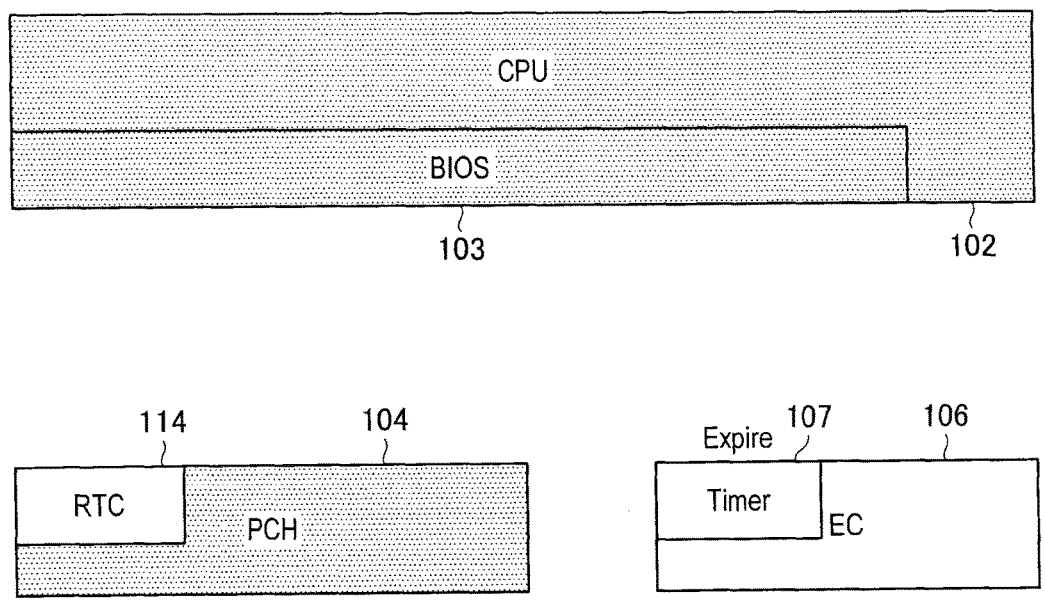
FIG. 8 is a schematic diagram illustrating an example of return from power off state by an RTC.

Next, as illustrated in FIG. 8, the EC 106 wakes up based on the time set in the timer 107 a few seconds before the date and time at which the chipset 104 is to be returned by the RTC wake. This is, as described above, because the timer 107 of the EC 106 is set to wake up slightly before the set date and time at the time at which the date and time of the RTC wake are set.

Figure 9:
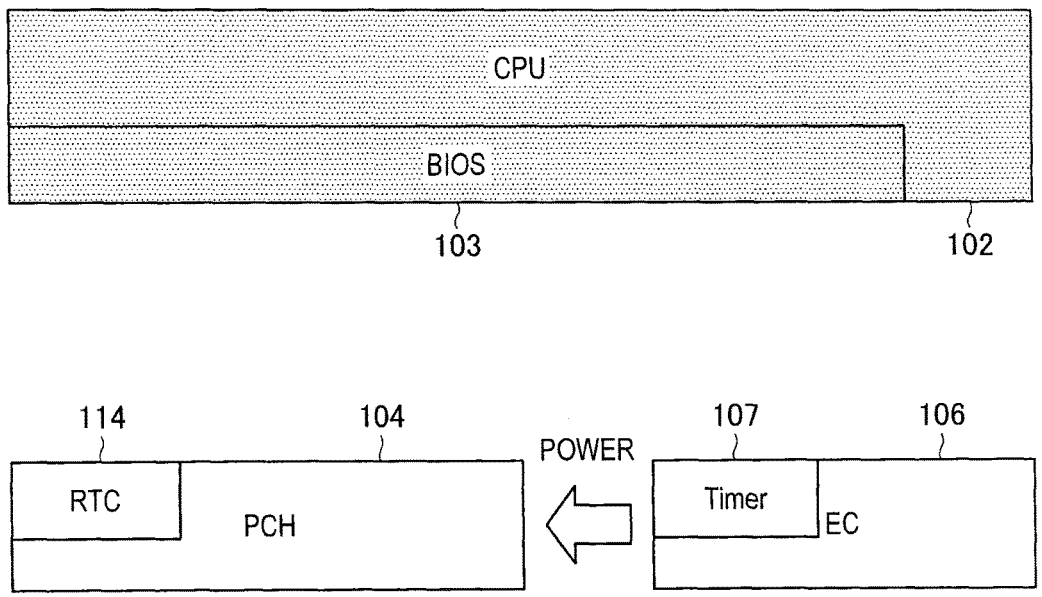
FIG. 9 is a schematic diagram illustrating an example of return from power off state by an RTC.

Next, as illustrated in FIG. 9, the returned EC 106 supplies power to the chipset 104. At this point, the time of RTC wake set in the RTC 114 is not reached, and the timer of the RTC 114 is unexpired. The power is supplied to the chipset 104, and thus an electrical RTC wake-enabled environment is prepared.

Figure 10:
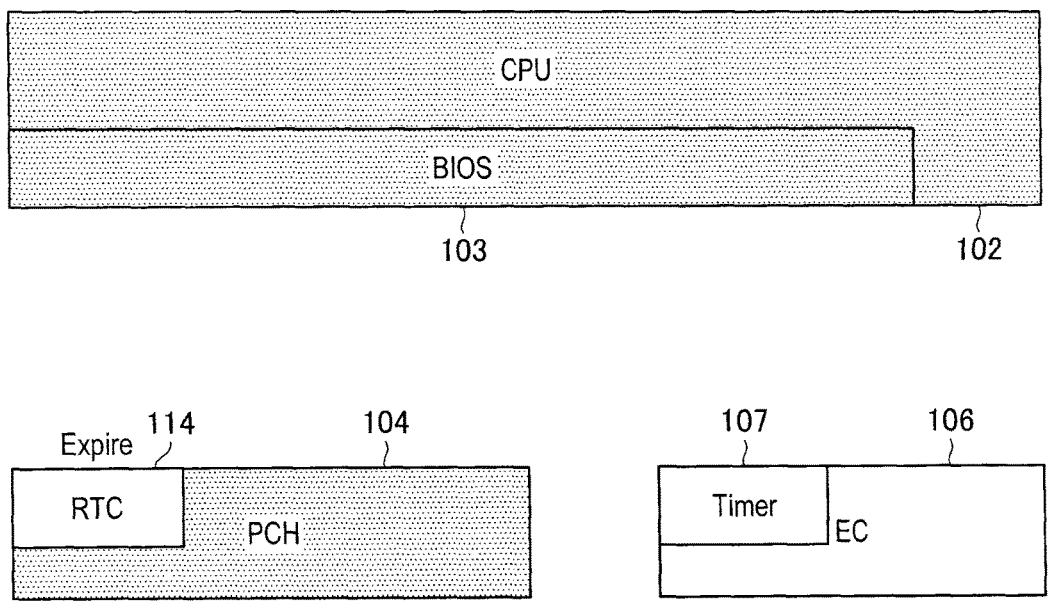
FIG. 10 is a schematic diagram illustrating an example of return from power off state by an RTC.

Next, as illustrated in FIG. 10, in a few seconds after the EC 106 wakes up, the timer of the RTC 114 in the chipset 104 is expired, and an RTC wake interrupt occurs.

Figure 11:
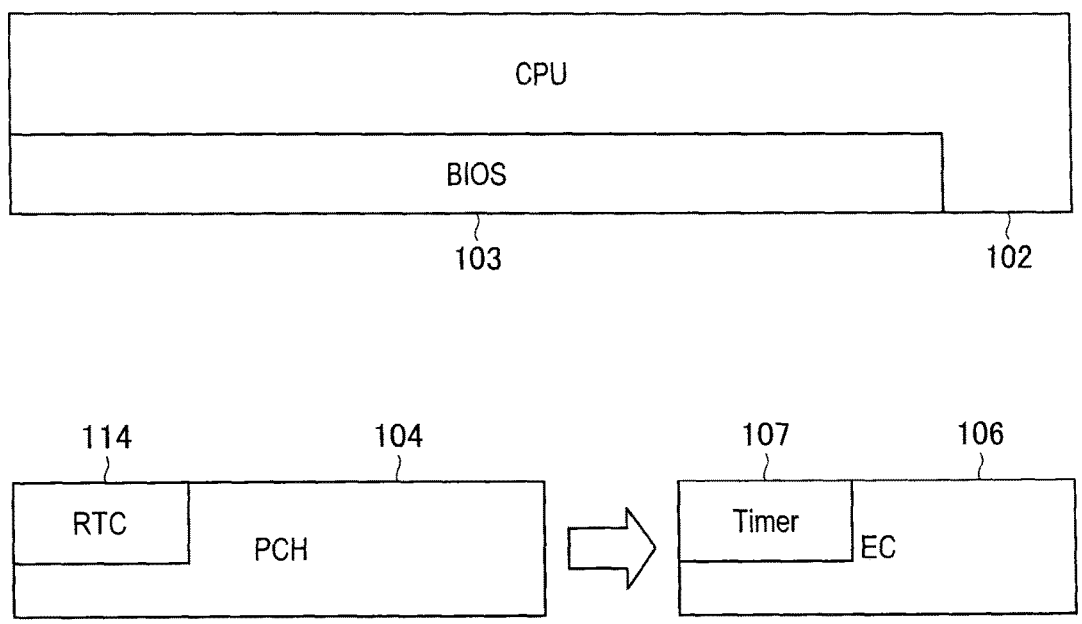
FIG. 11 is a schematic diagram illustrating an example of return from power off state by an RTC.

Subsequently, as illustrated in FIG. 11, after the RTC wake occurs, the system changes the mode to S0 through a normal return path. As a result, the power is supplied to the chipset 104 and the processor 102.

The EC 106 operates only to create an environment in which the RTC wake is feasible, and the system automatically wakes up by the RTC wake and then reaches S0 after the power is supplied to the chipset 104. Thus, in the present embodiment, the system changes the mode to S0 and then wakes up using the mechanism of the actual RTC wake. Thus, compared to the case where the EC 106 is used as an alternative to the RTC 114 as disclosed in Patent Literature 1, it is possible to wake up accurately at the time of the RTC 114 (system time).

Thus, even when the accuracy of an external timer such as the timer 107 is low and its time is deviated from the time of the RTC 114, the EC 106 wakes up sufficiently early and thus it is possible to wake up the system exactly while matching with the time of the RTC 114. Accordingly, for example, even when the recording of a TV program is performed, the recording can be performed accurately while matching with the time of the TV program based on the time of the RTC 114. In addition, it is easy to notify that the resumption is performed through the RTC 114 in terms of an OS or BIOS. Accordingly, the intended operation can be performed at the time when the user wants.

According to examples illustrated in FIGS. 6 to 11, even when the power supply to the chipset 104 is cut off, if the user intends to perform the RTC wake, a wake operation using the RTC 114 can be performed properly. Accordingly, the RTC wake can be supported by the RTC 114 and it is not necessary to emulate the RTC wake using devices other than the RTC 114 such as the EC 106, thereby improving the accuracy of the wake-up time of the system.

This wake-up, compared to emulation that uses external devices, uses RTC wake, and thus errors of wake-up time obtained from an OS can be suppressed. In addition, it is possible to detect easily that an OS performs the RTC wake.

In addition, in a case of normal RTC wake, it is based on the premise that the power is supplied to the RTC 114, the chipset 104, and the EC 106. In the present embodiment, the EC 106 wakes up immediately before the RTC wake, the chipset 104, the RTC 114, and the EC 106 can keep the power sources turned off until immediately before the RTC wake. Thus, it is possible to significantly reduce the power consumption.

3.2. Power ON/OFF Management of Devices by EC

Figure 12:
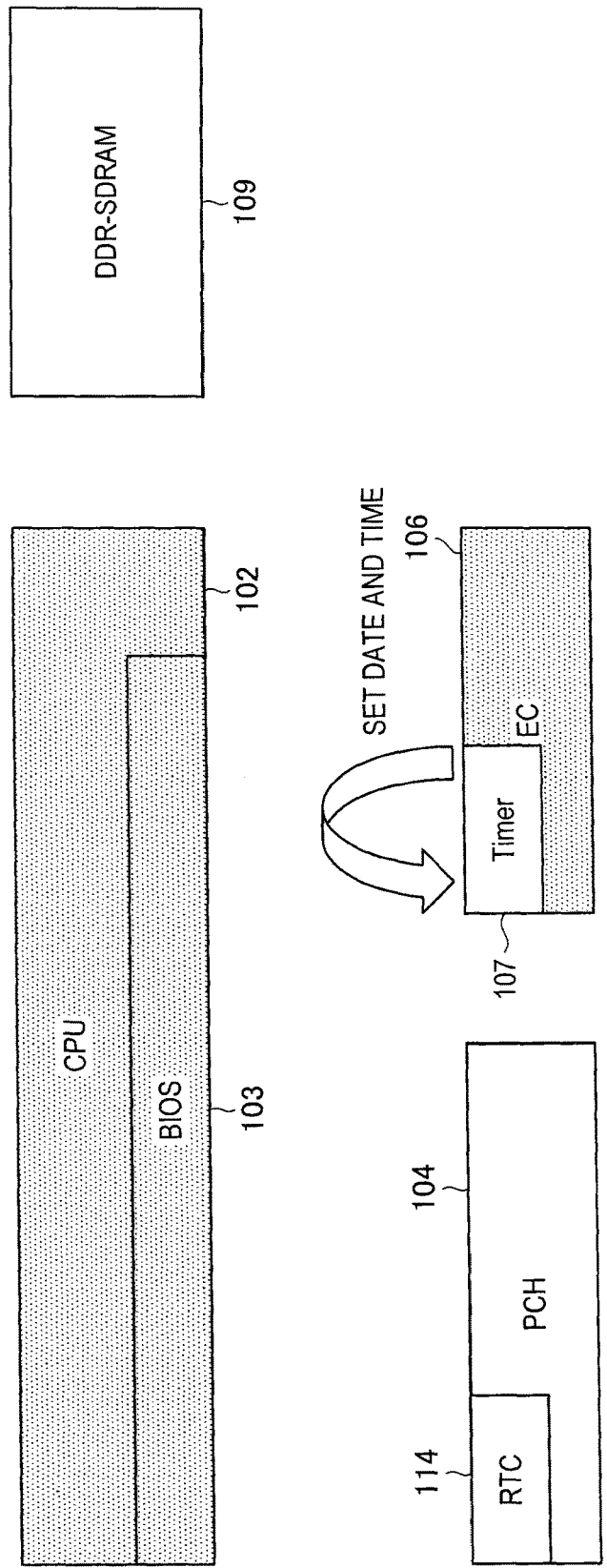
FIG. 12 is a schematic diagram illustrating the power on/off control of devices by an EC.
Figure 13:
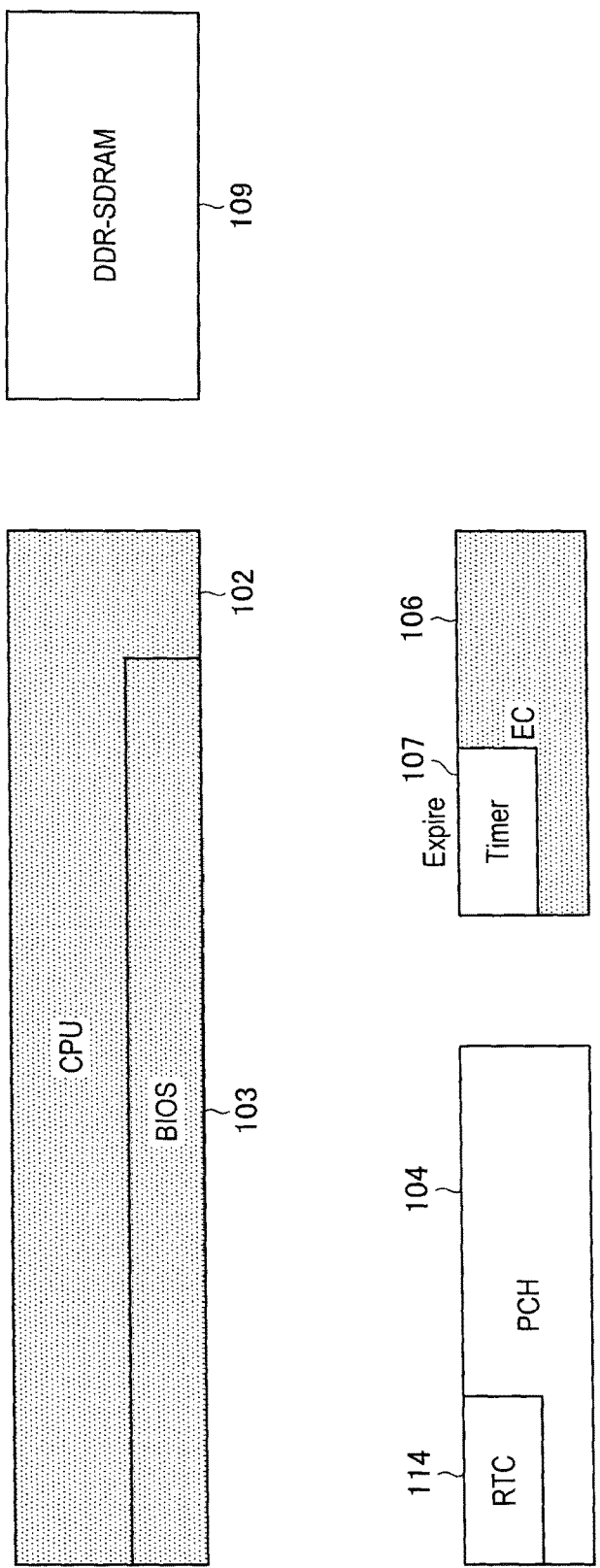
FIG. 13 is a schematic diagram illustrating the power on/off control of devices by an EC.
Figure 14:
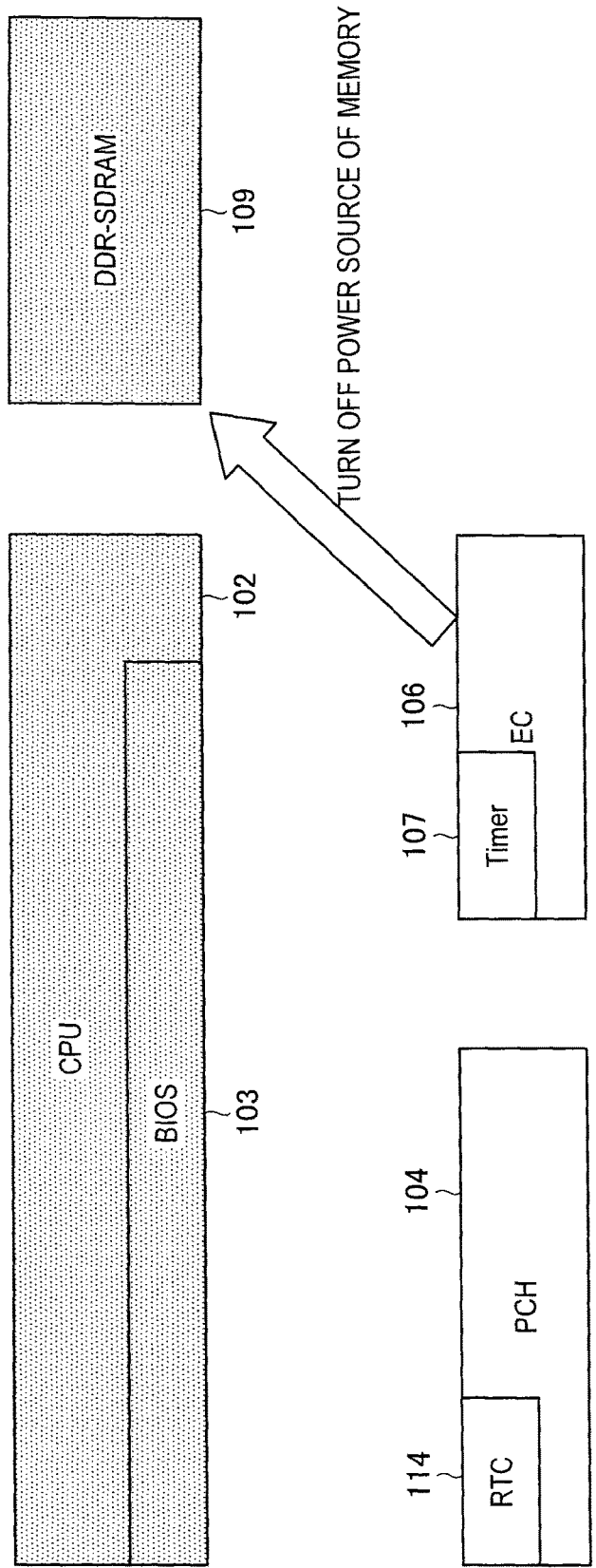
FIG. 14 is a schematic diagram illustrating the power on/off control of devices by an EC.

Next, the power on/off management of devices by the EC 106 is described with reference to FIGS. 12 to 14. When it is necessary for the EC 106 to manage the power sources of devices, it is necessary to keep the EC 106 turned on, but this leads to an increase in power consumption. Thus, in the example described below, the alarm timer 107 is used, and the EC 106 is powered on only moment when an operation (for example, monitoring and power on/off) of power source management of devices is actually necessary. In other periods, the EC 106 is powered off. This allows low power consumption to be obtained. In FIGS. 12 to 14, a region marked with dots indicates a power off state, and a region not marked with dots indicates a power on state.

In this example, the EC 106 is assumed to manage the power source of the main memory 109. As illustrated in FIG. 12, the EC 106 set the date and time at which the memory 109 is turned off in its own alarm timer. In this case, it is recorded to turn off the memory power source at the time of the next wakeup.

Then, as illustrated in FIG. 12, the processor 102 and the EC 106 are powered off in the state where the memory 109 is powered on.

Subsequently, as illustrated in FIG. 13, while the processor 102 is powered off, the alarm timer of the EC 106 is expired and the EC 106 is powered on.

Then, as illustrated in FIG. 14, the EC 106 performs a power source management operation on the main memory. The EC 106 sets the date and time at which the memory 109 is powered off in its own alarm timer, and thus the EC 106 turns off the power source of the main memory 109 after the EC 106 turns off its own power source.

According to the examples illustrated in FIGS. 12 to 14, it is unnecessary to keep the EC 106 turned on to manage the power sources of devices. This makes it possible to turn off the power source of the EC 106 in situations where the EC 106 is necessary to manage the power source of any device.

3.3. Exemplary Configuration of Second Embodiment

Next, a specific configuration to perform the operation of the above-described second embodiment is described. FIG.

15 is a schematic diagram illustrating the configuration of the processor 102, the chipset (PCH) 104, the EC 106, and the memory 109. The power is supplied separately to the chipset 104 and the RTC 114. PCH power is supplied to the chipset 104, and RTC power is supplied to the RTC 114. In addition, the power is supplied separately to the EC 106 and the timer 107. EC power is supplied to the EC 106, and BAT power is supplied to the timer 107. In addition, the power source (CPU power) is supplied to the processor 102.

Figure 15:
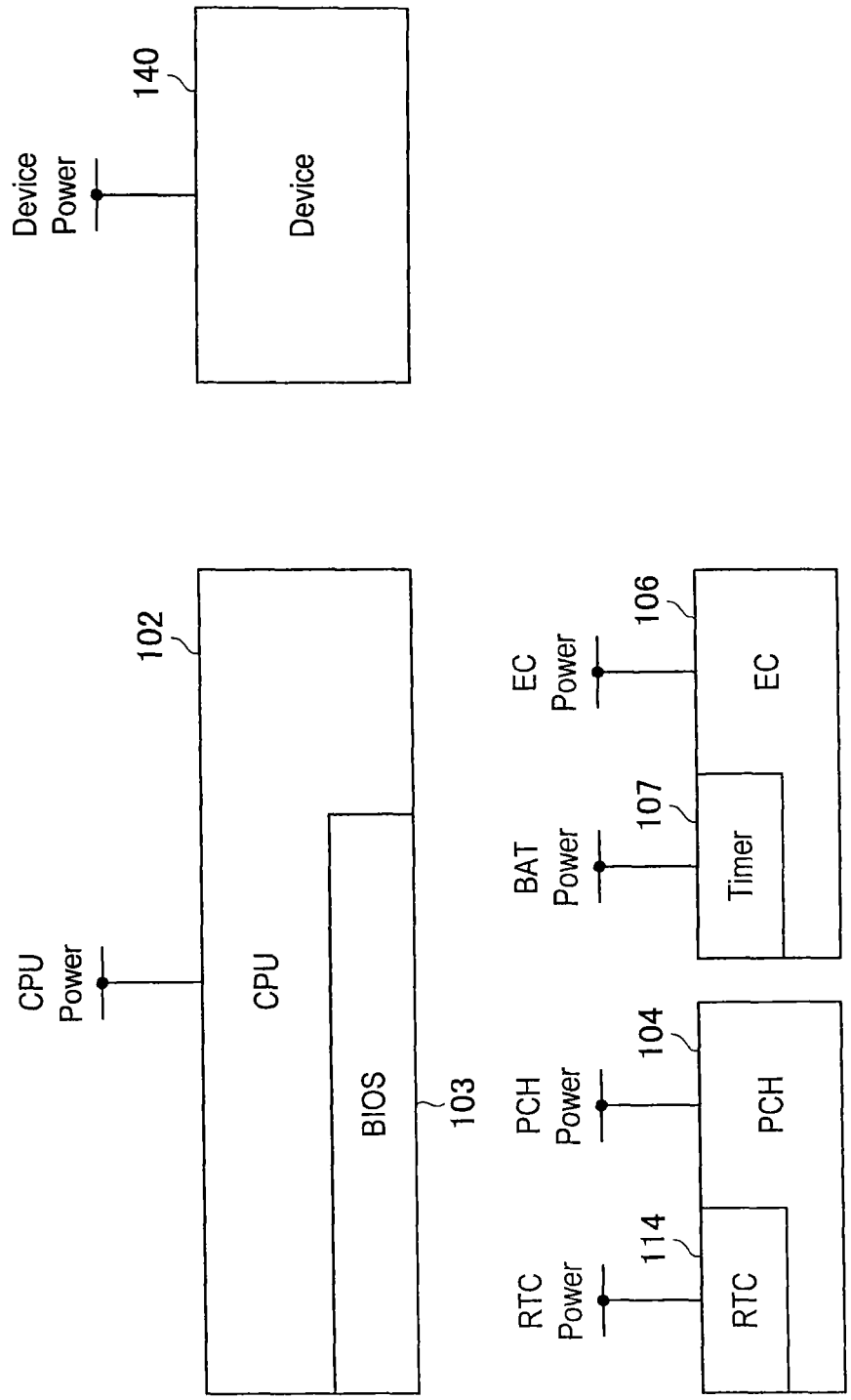
FIG. 15 is a schematic diagram illustrating the configuration of a processor, a chipset (PCH), an EC, and a memory.

As illustrated in FIG. 15, the timer 107, the RTC 114, the chipset 104, the processor 102, the EC 106, and the memory 109 have the respective power sources, which can be controllable separately. Then, the EC 106 is configured to control the power on/off of devices except for the RTC 114 and the timer 107. According to the configuration illustrated in FIG. 15, even in the state where the EC 106 is not waked up, it is possible to activate the timer 107. In addition, even in the state where the chipset 104 is not waked up, it is possible to activate the RTC 114.

Figure 16:
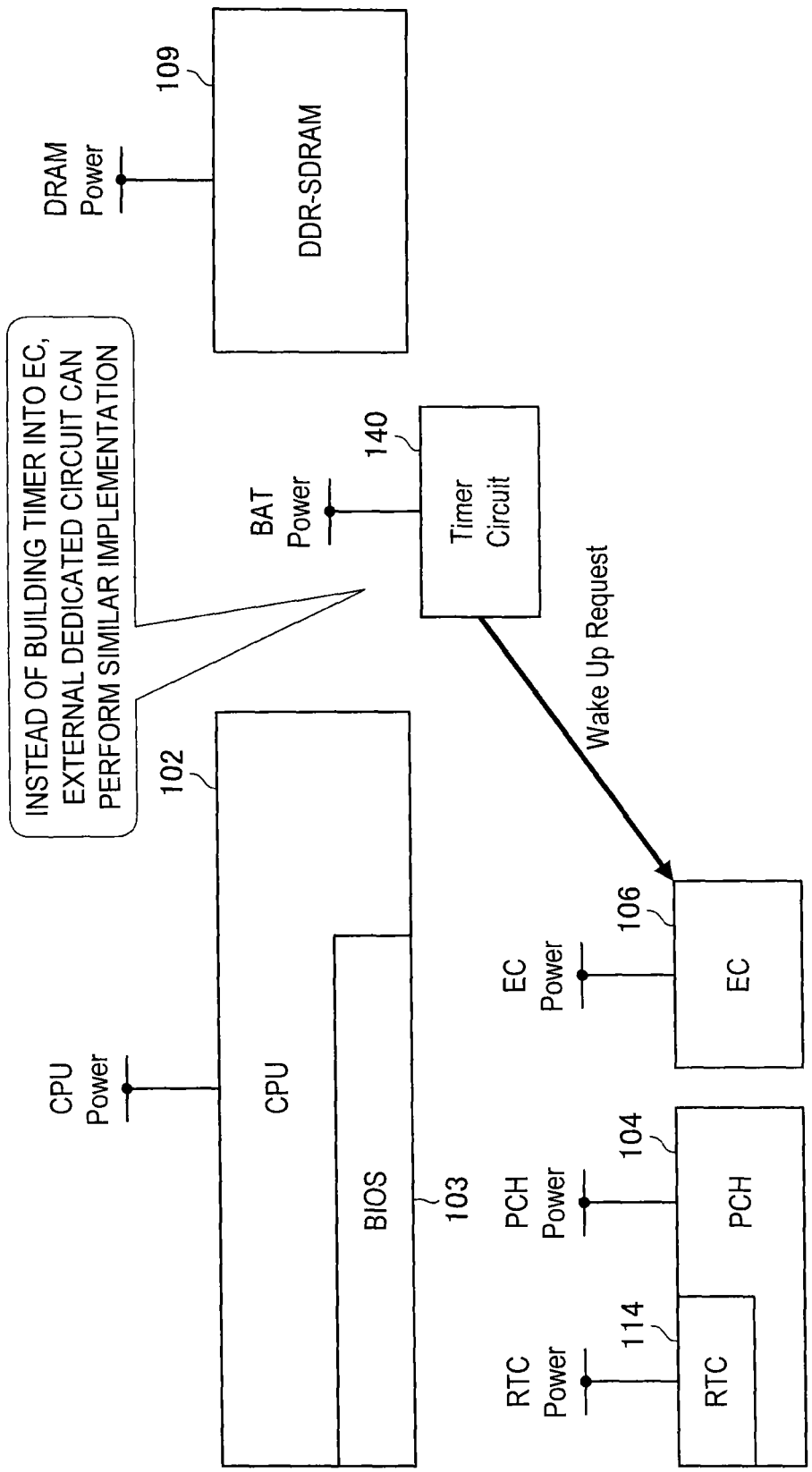
FIG. 16 is a schematic diagram illustrating a modified example of the configuration of FIG. 15.

FIG. 16 is a schematic diagram illustrating a modified example of the configuration of FIG. 15. In the example illustrated in FIG. 15, the timer 107 is built in the EC 106, but as the example illustrated in FIG. 16, it may be possible to provide an external dedicated circuit 140 that has a similar function to that of the timer 107. In this case, the dedicated circuit 140 generates an interrupt signal of wake-up request (Wake Up Request) for the EC 106.

Figure 17:
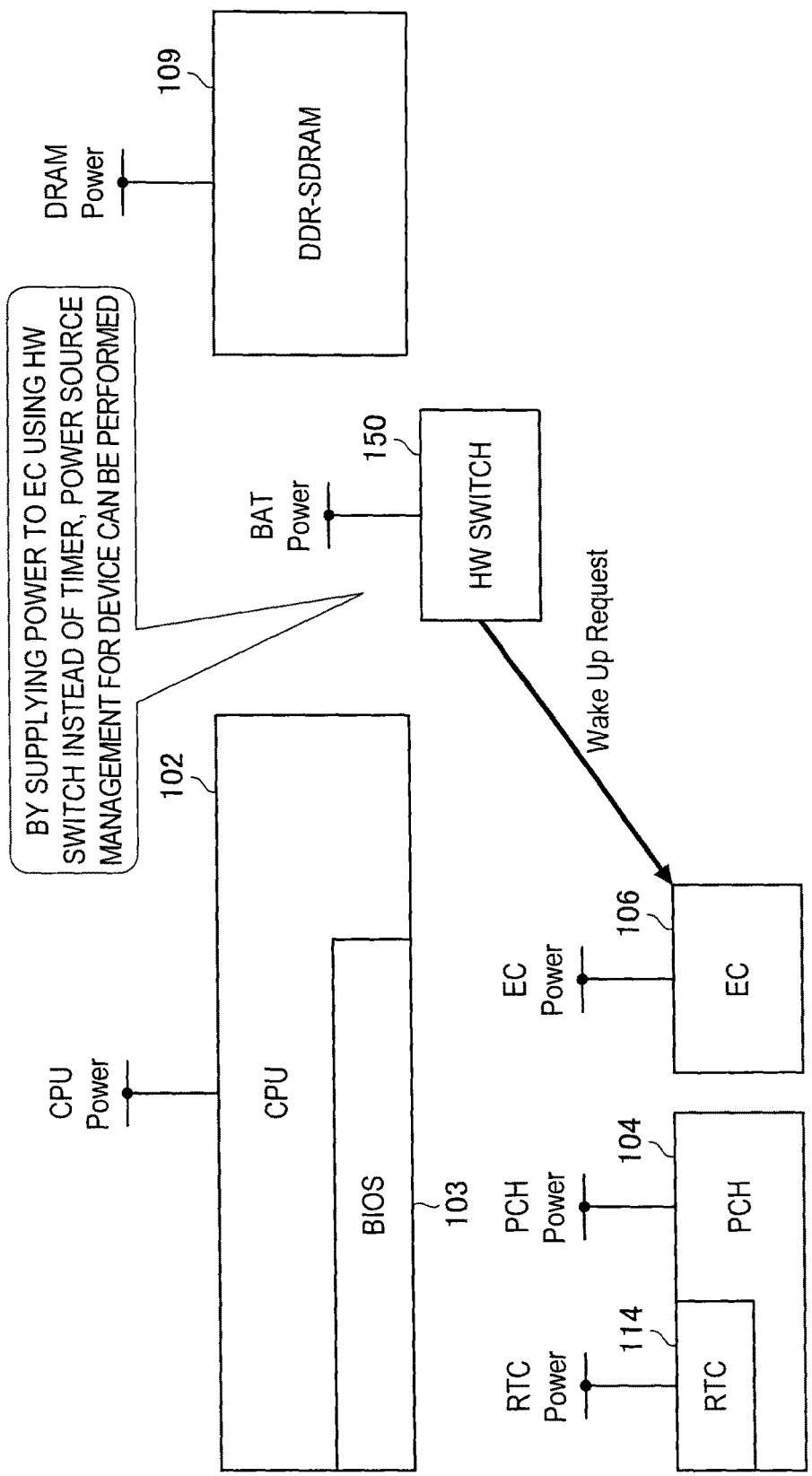
FIG. 17 is a schematic diagram illustrating an example of providing a hardware (HW) switch 150 instead of a dedicated circuit of FIG. 16.

In addition, FIG. 17 illustrates an example in which a hardware (HW) switch 150 is provided instead of the dedicated circuit 140 of FIG. 16. In this way, it is also possible to wake up the EC 106 using a trigger other than the timer 107. As illustrated in FIG. 17, the generation of interrupt signals for the wake-up request by the HW switch 150 allows the EC 106 to be supplied with power, and thus it is possible to implement the power source management of devices.

Figure 18:
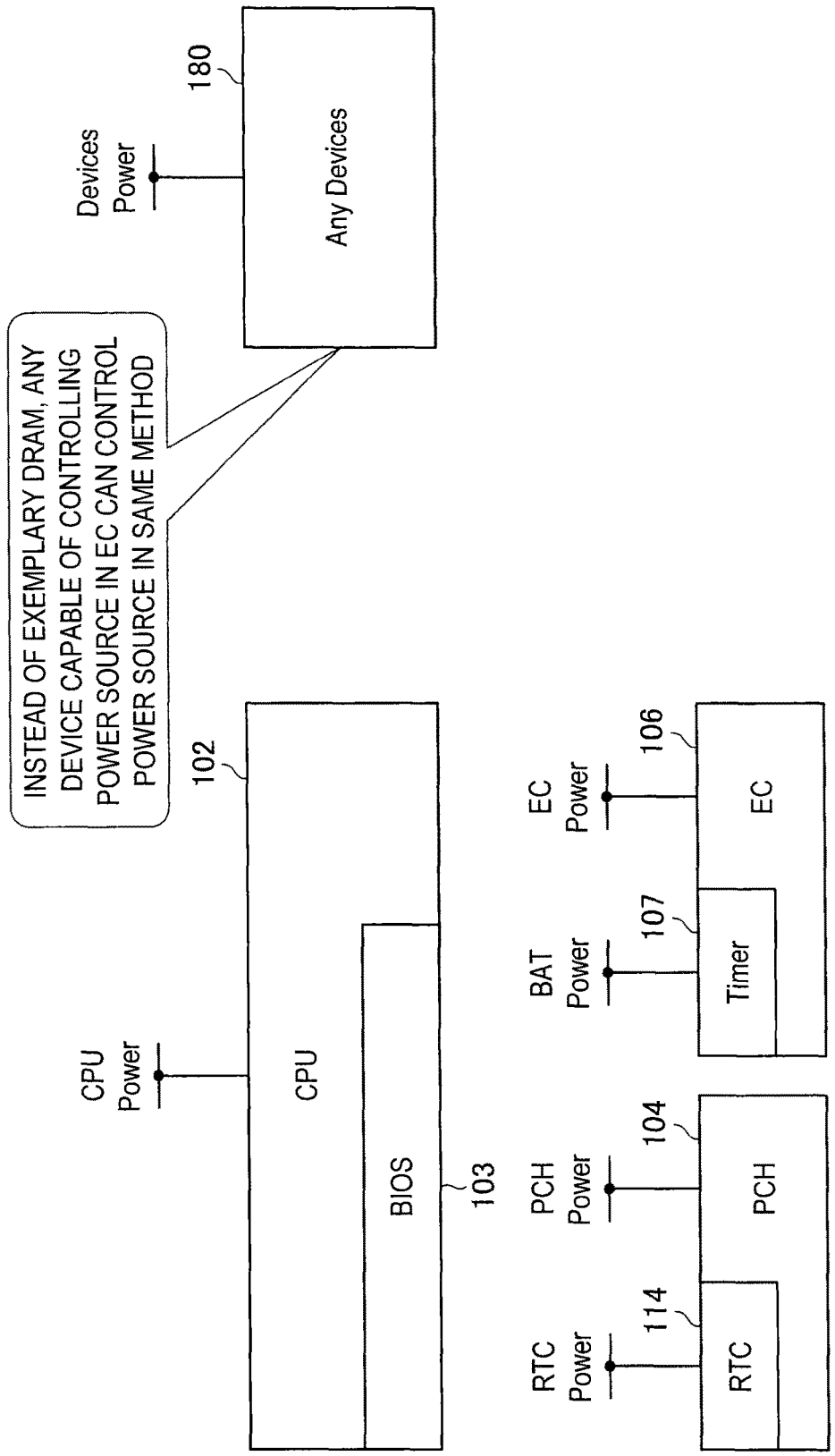
FIG. 18 is a schematic diagram illustrating an example of providing any device 160 instead of a memory 109 in FIG. 15.

In addition, FIG. 18 is a schematic diagram illustrating an example in which any device 160 is provided instead of the memory 109 in the configuration of FIG. 15. Any device capable of controlling the power source in the EC 106 other than the memory (DRAM) 109 can control the power source with the same configuration.

Figure 19:
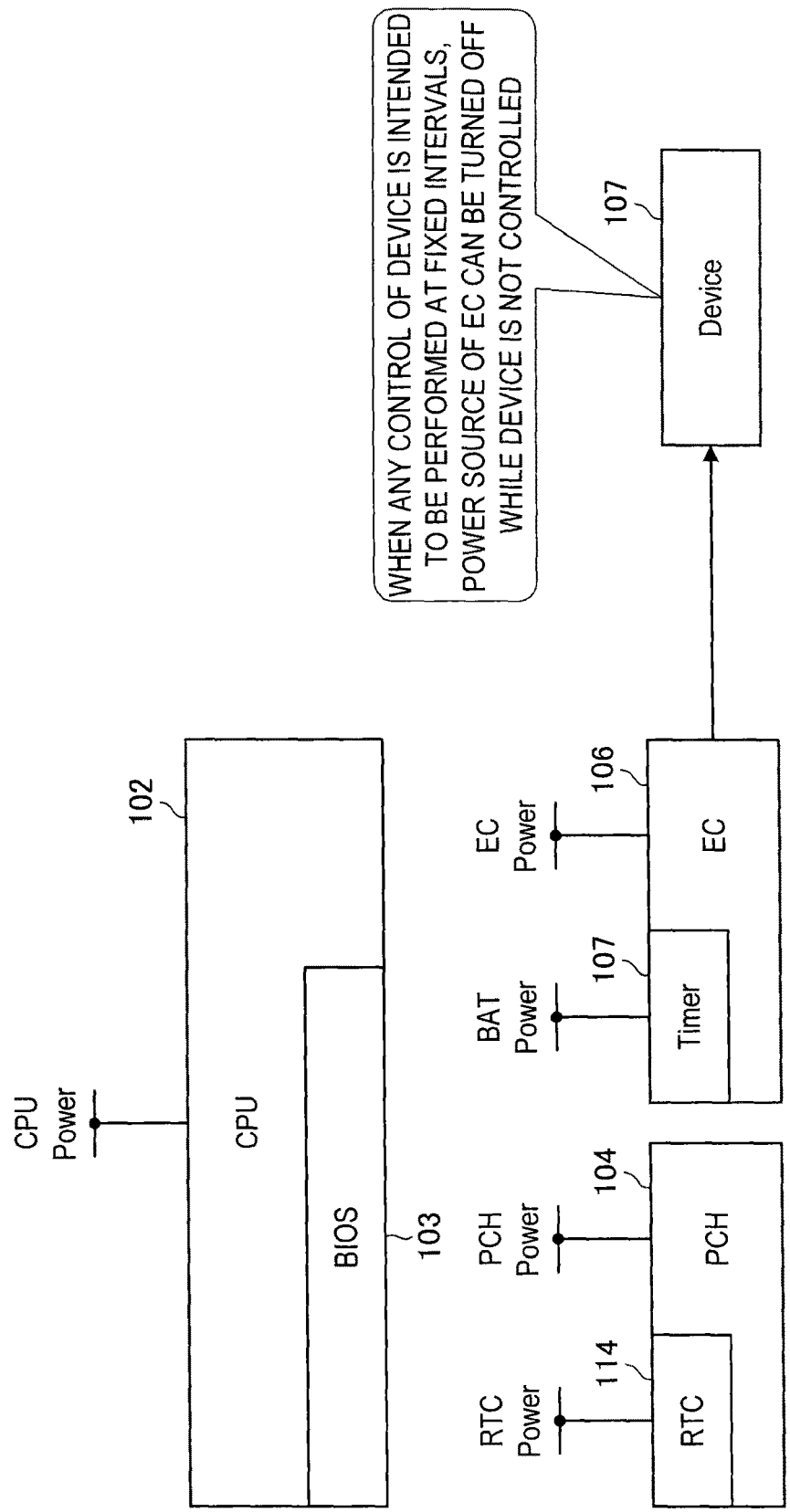
FIG. 19 is a schematic diagram illustrating the configuration used in applications other than power source control.

In addition, FIG. 19 is a schematic diagram illustrating the configuration that is applicable to applications other than power source control. In FIG. 19, the EC 106 performs a control other than power source control for another device 170. When it is intended for the other device 170 to be controlled at fixed intervals, the EC 106 can be powered off while the device 170 is not controlled. In this way, even when other control than the power source control is performed, it is possible to reduce the power consumption by turning on the EC 106 only if necessary.

4. Third Embodiment

4.1. Overview of USB Charging

Next, a third embodiment of the present disclosure is described. The third embodiment relates to the technology that connects the information processing apparatus 100 with another apparatus and charges the other apparatus. In the present embodiment, especially, USB charging is described as an example.

The USB charging is defined by the battery charging specification (hereinafter, referred to as BCS) that is the fast charging standard using a bus power established by the USB-IF. The latest version of BCS is Ver.: Revision 1.2 (released in Dec. 7, 2010). In the past, the USB bus power can supply electric power of only up to 500 [mA] (900 [mA] for USB 3.0) at voltage of 5 [V]±5%, but in a BCS compliant case, the electric power of up to 1.5 [A] can be supplied at voltage of 5 [V]±5%.

The definition of USB charging port is described. The following three types of ports are defined in the BCS.

1. SDP: Standard Downstream Port

This type of port is a typical USB port, can communicate with other devices, and can supply 500 [mA] from VBUS.

2. DCP: Dedicated Charging Port

This type of port can supply a maximum of 1.5 [A] from VBUS and is unable to communicate.

3. CDP: Charging Downstream Port

This type of port can supply a maximum of 1.5 [A] from VBUS and is able to communicate.

In principle, devices connected only during S0 can be charged, but devices can be charged in S3 and the subsequent states by changing setting of a port of each state. Thus, devices, which are connected to the information processing apparatus 100 and are powered by USB charging, include, for example, smartphone and digital camera. Some devices draw VBUS automatically even during S3.

Moreover, the power of only up to 2.5 [mA] can be supplied in suspend state, but in DCP/CDP, the power of up to 100 [mA] can be supplied and the power can be return rapidly even when the battery of a device to be charged is in a completely discharged state.

FIG. 20 is a schematic diagram illustrating an example of implementation specification of each state in the information processing apparatus 100 according to the present embodiment. In this example, it is assumed that there are a default and two types of charging modes. The default is a factory default setting and is the same settings as a normal USB port. In default, S0 and S3 are set as SDP. In case of charging mode, S0 is set as CDP in default, and states other than S0 are set as DCP. Thus, fast charging is possible in all states.

As described above, in DCP and CDP, fast charging of devices connected to the information processing apparatus 100 can be performed. On the other hand, the power consumption increases during fast charging, and when the information processing apparatus 100 is disconnected from an AC power source, the battery 122 may have no remaining capacity. In particular, if there is no remaining capacity of the battery 122 in the middle of writing data to the storage device 116 due to hibernation, then data may be lost.

Thus, in the present embodiment, the risk of data loss is reduced by stopping temporarily USB charging under a predetermined condition.

4.2. Measures Against Data Loss as Basis

First, measures against data loss served as a basis are described. When the information processing apparatus 100 is connected to an AC power source, devices connected to the information processing apparatus 100 can be reliably charged without causing data loss. On the other hand, if the USB charging is performed in the state where the information processing apparatus 100 is disconnected from an AC power source (when powered by DC), then the residual capacity of the battery 122 may be used up, resulting in a potential loss of data regarding information displayed on the screen of the information processing apparatus 100 and information stored in the memory 109.

Thus, as measures against data loss served as a basis, low-battery hibernation (hereinafter, also referred to as LBH) and timer hibernation (hereinafter, also referred to as Timer Hib) are described.

<Low-Battery Hibernation (LBH)>

Figure 21:
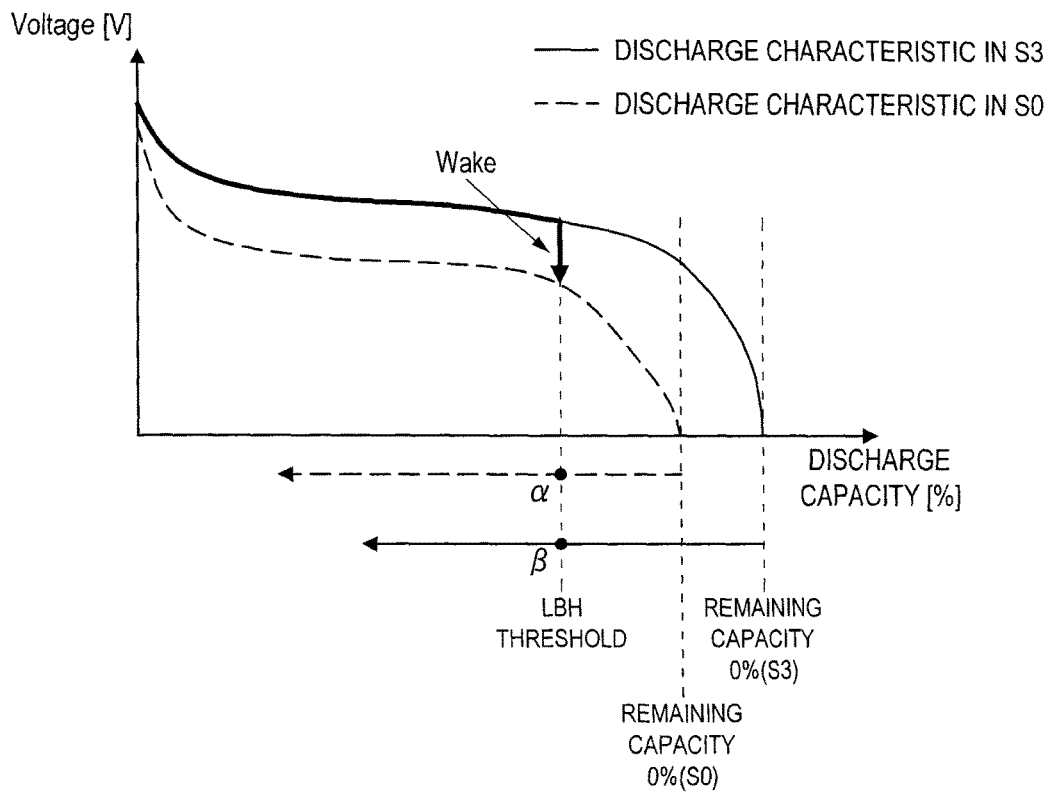
FIG. 21 is a schematic diagram illustrating discharge characteristics in S3 and S0 states.
Figure 22:
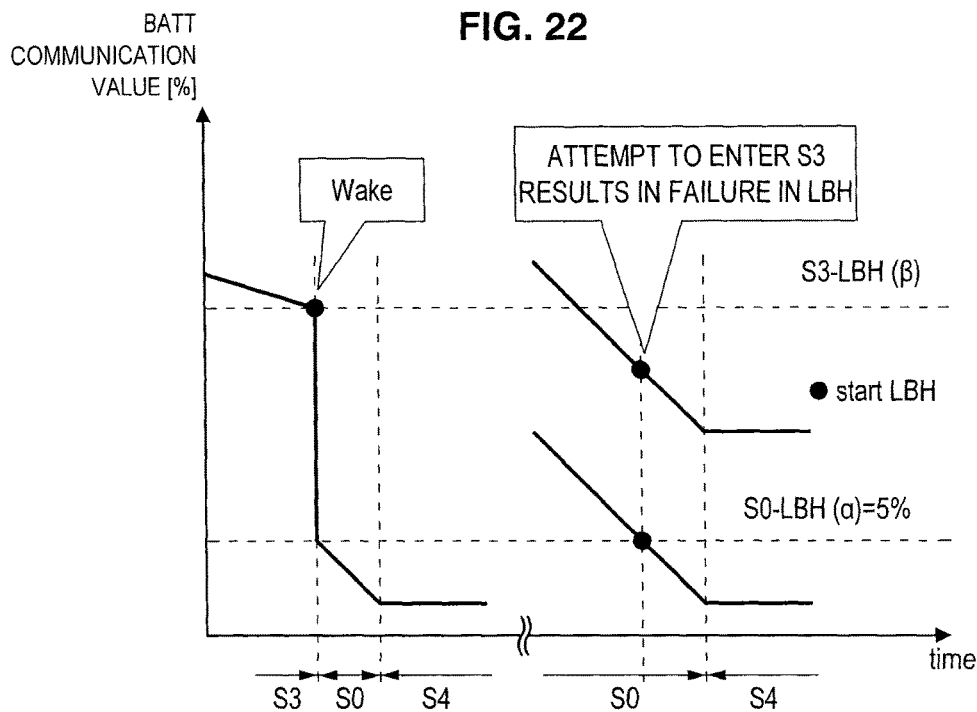
FIG. 22 is a characteristic diagram illustrating a threshold value of LBH.

In LBH, when the remaining capacity of the battery 122 falls below a certain threshold value in S0 or S3 state, an image is written to the storage device 116 and a transition to S4 is performed. In S3 state, the wake-up is performed in S0 state and writing to the storage device 116 is performed. FIG. 21 is a schematic diagram illustrating discharge characteristics in S3 and S0 states. In addition, FIG. 22 is a characteristic diagram illustrating a threshold value of LBH. As illustrated in FIG. 21, discharge characteristic in S3 state is different from that in S0 state, and thus, by considering this, different threshold values are set for S3 and S0. In this case, the relationship of (threshold of LBH in S0)<(threshold of LBH in S3) is established because of characteristics of a battery, and thus there is a region in which the user does not change from S0 to S3. For example, if an LBH threshold value in S0 is set to 5% of the remaining battery capacity, an LBH threshold value in S3 is set to 30% of the remaining battery capacity, and a transition to S3 in a state where the remaining battery capacity is 25% is performed in S0, then LBH is activated and a transition to S4 is performed.

The amount of power consumption at the time of USB charging is greater than a normal USB communication, and the battery 122 may possibly have no remaining capacity in the middle of creation of Hib image in LBH. In the case, data loss may occur.

<Timer Hibernation>

Figure 23:
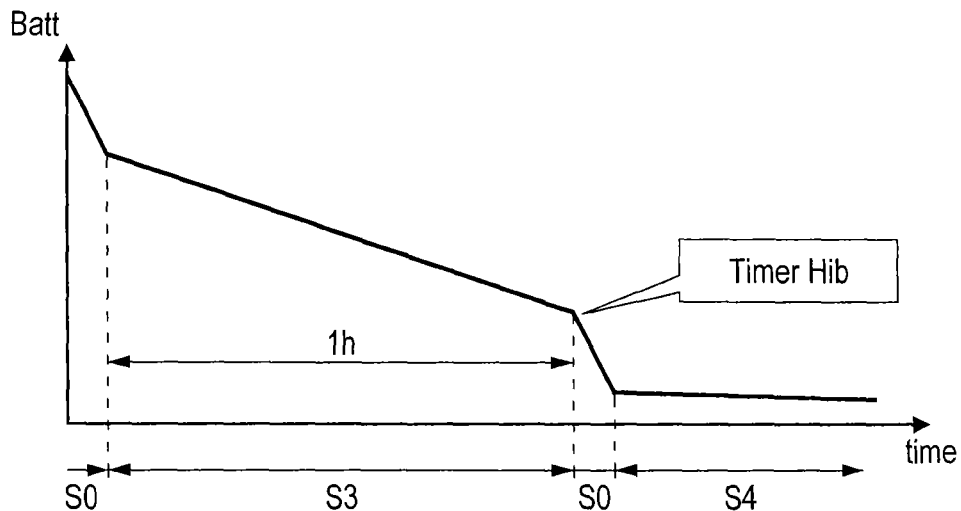
FIG. 23 is a characteristic diagram illustrating the timer hibernation.

FIG. 23 is a characteristic diagram illustrating the timer hibernation in which the vertical axis represents the remaining battery capacity and the horizontal axis represents time. In timer hibernation, when powered by DC, the transition to S3 is performed, and then if one hour has elapsed, wake-up is made in S0, writing of an image to the storage device 116 is performed, and then the transition to S4 is performed.

In timer hibernation, the remaining capacity of the battery 122 may possibly become exhausted in the period of the timer of one hour. In addition, in timer hibernation, creation of Hib image necessitates the wake-up in S0 state. Thus, it will take time longer than the low-battery hibernation for the creation of image, and the battery is more likely to have no remaining capacity.

Figure 24:
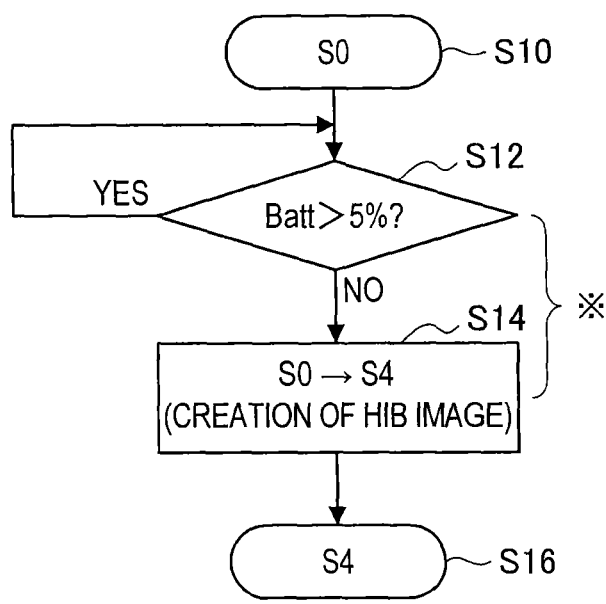
FIG. 24 is a flowchart illustrating a process of LBH.

FIG. 24 is a flowchart illustrating a process of LBH. FIG. 24 illustrates an example in which LBH begins to operate during S0. In step S12, if the remaining battery capacity is less than or equal to 5%, the process proceeds to step S14 and Hib image is created, and then a transition from S0 to S4 is performed. As described above, the amount of power consumed while USB charging is large, power is consumed even in steps S12 and S14 during USB charging, and the remaining capacity of the battery 116 may possibly be exhausted in the middle of creation of Hib image.

Figure 25:
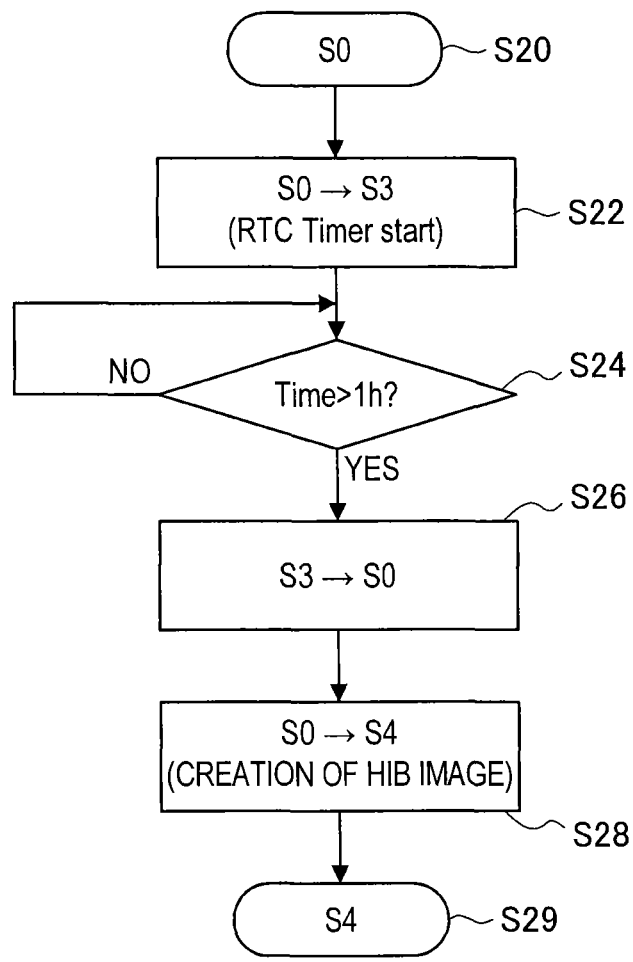
FIG. 25 is a flowchart illustrating a process of the Timer Hib.

FIG. 25 is a flowchart illustrating a process of the Timer Hib. The Timer Hib begins to operate only during S3. In step S22, a transition from S0 to S3 is performed, and the timer of the RTC 114 starts. In step S24, it is determined whether the timer exceeds one hour, if the timer exceeds one hour, then a transition from S3 to S0 is performed is step S26. If the timer is less than or equal to one hour, then the process returns to step S24. In step S28, Hib image is created and a transition from S0 to S4 is performed. In this way, the creation of Hib image necessitates the wake-up in S0, so it will take time longer than LBH for the creation of the image, and thus the battery 122 is more likely to have no remaining capacity.

4.3. Measures Against Data Loss According to Present Embodiment

Figure 26:
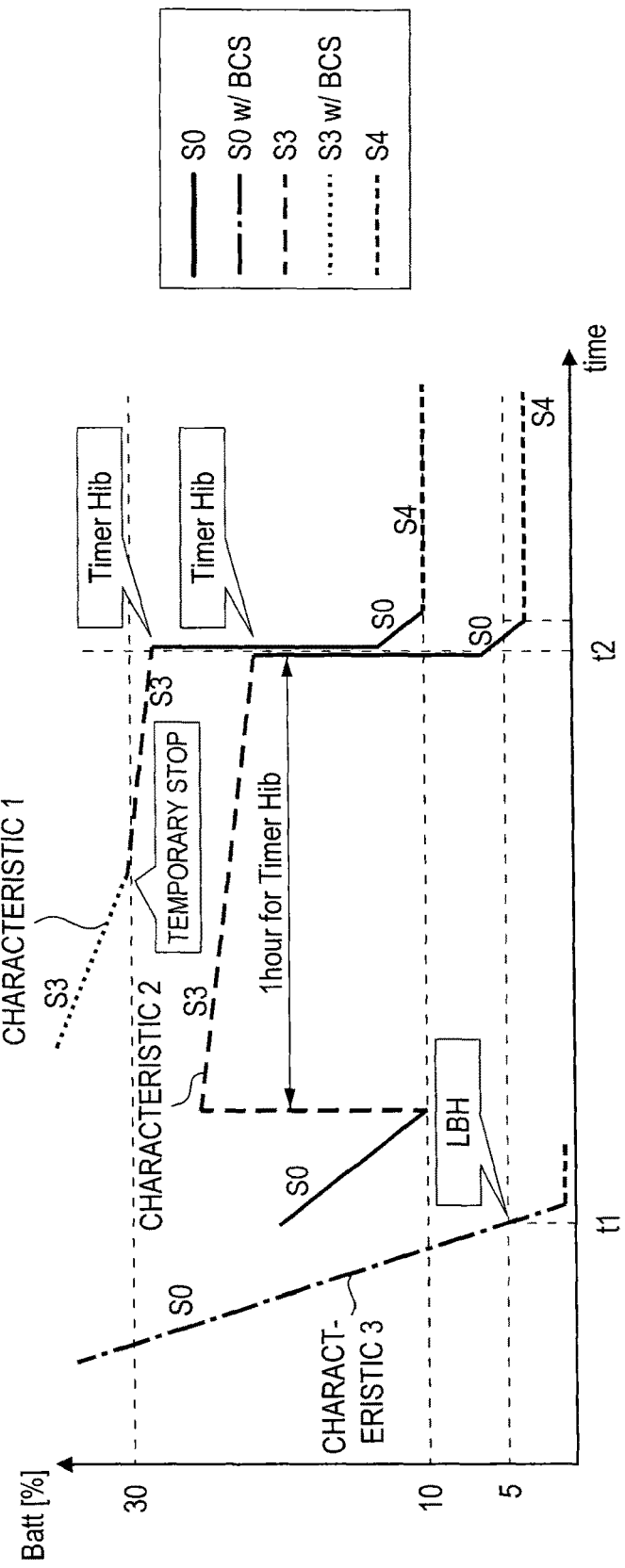
FIG. 26 is a timing chart illustrating a temporary stop mechanism.

In view of the above, as measures against data loss according to the present embodiment, a temporary stop mechanism of USB charging is described. FIG. 26 is a characteristic diagram illustrating a temporary stop mechanism in which the vertical axis represents the remaining capacity of the battery 122 and the horizontal axis represents time.

In the temporary stop mechanism, during the USB charging in S3, if the remaining battery capacity is, for example, 30%, then the power supply using USB charging is temporarily stopped (characteristic 1). A predetermined period of time has elapsed after stopping the power supply, Timer Hib is activated at time t2.

Characteristic 2 in FIG. 26 indicates a case where Timer Hib is activated at time t2 at which a transition to S3 is performed when USB charging is not performed in S0 and then one hour has elapsed.

In addition, characteristic 3 indicates a case where the remaining capacity of the battery 122 becomes 5% or less during USB charging in S0. In this case, LBH is activated at time t1.

The temporary stop is obtained under the condition in which power is supplied by DC, during S3, and the remaining battery capacity falls below 30%. Thus, the temporary stop is not activated for characteristics 2 and 3 of FIG. 26.

Figure 27:
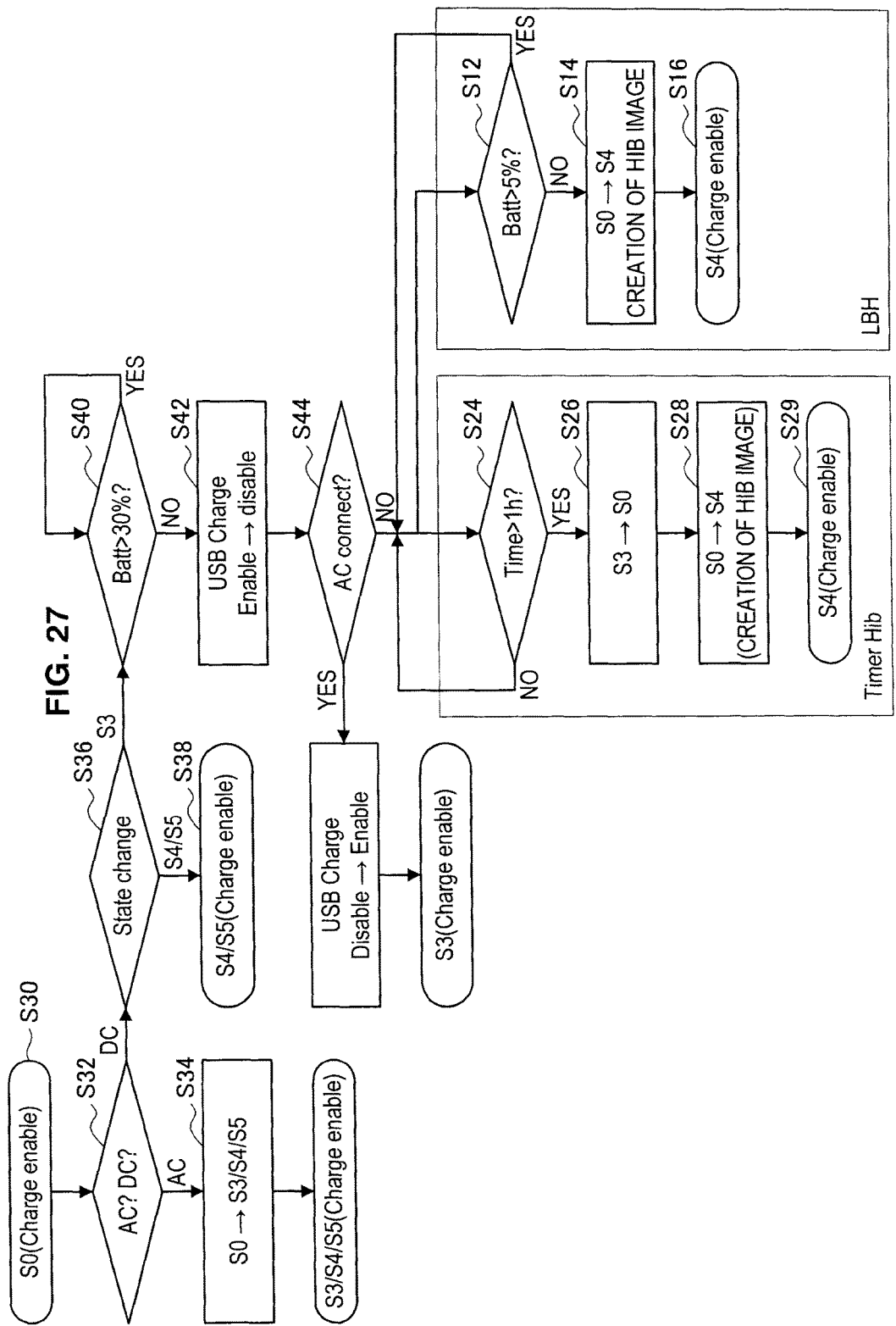
FIG. 27 is a timing chart illustrating a temporary stop mechanism.

FIG. 27 is a flowchart illustrating the temporary stop mechanism. The configuration that implements this process can be composed of hardware (circuitry) or can be composed of a central processing unit such as CPU and a program for causing the central processing unit to perform the function. First, in step S30, the USB charging is enabled in S0 state. In the next step S32, it is determined whether the power supply is AC or DC. If it is determined that the power supply is AC, then the process proceeds to step S34 and a transition from S0 to S3, S4, or S5 can be performed in a state USB charging is enabled. In this case, the USB charging is possible in S3, S4, or S5.

If it is determined that the power supply is DC, then the process proceeds to step S36 and determines if a change in state occurs. If a transition to S4 or S5 is performed (step S38), there is no possibility of data loss, and thus the transition to S4 or S5 is performed in the state where the USB charging is enabled. When a transition to S3 is performed (step S40), it is determined whether the remaining battery capacity exceeds 30% or not. If the remaining battery capacity exceeds 30%, then the process waits in step S40. On the other hand, if the remaining battery capacity is less than or equal to 30%, then the process proceeds to step S42, and in this step, the temporary stop condition is satisfied and thus a transition from the USB charging enable state to a USB charging disable state is performed. Accordingly, the USB charging of a device connected to the information processing apparatus 100 is stopped.

Subsequently, in step S44, if it is determined that there is a connection to an AC power source, then the process proceeds to step S46 and a transition from the USB charging disable state to the USB charging enable state is performed.

On the other hand, in step S44, if it is determined that there is no connection to an AC power source, then the process proceeds to the subsequent process, and the process of LBH (steps S12 to S16 of FIG. 24) or the process of Timer Hib (steps S24 to S29 of FIG. 25) is performed.

Here, a basis for setting the remaining battery capacity to 30% (a threshold value in which data loss does not occur) as a condition to activate the temporary stop mechanism is described. This activation condition, for example, when there are multiple of line-up models for the information processing apparatus 100 of interest, can be set as a uniform specified value for all the models of the information processing apparatus 100. In this case, it is possible to save time and effort for setting a threshold value for each model. In this time, it is preferable to set a threshold value to cover all the cases from a high performance PC to a PC with low battery capacity.

Figure 28:
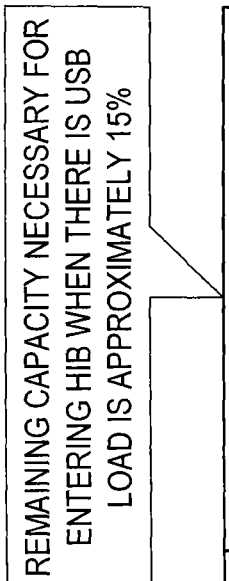
FIG. 28 is a schematic diagram illustrating a Hibernation load.
Figure 29:
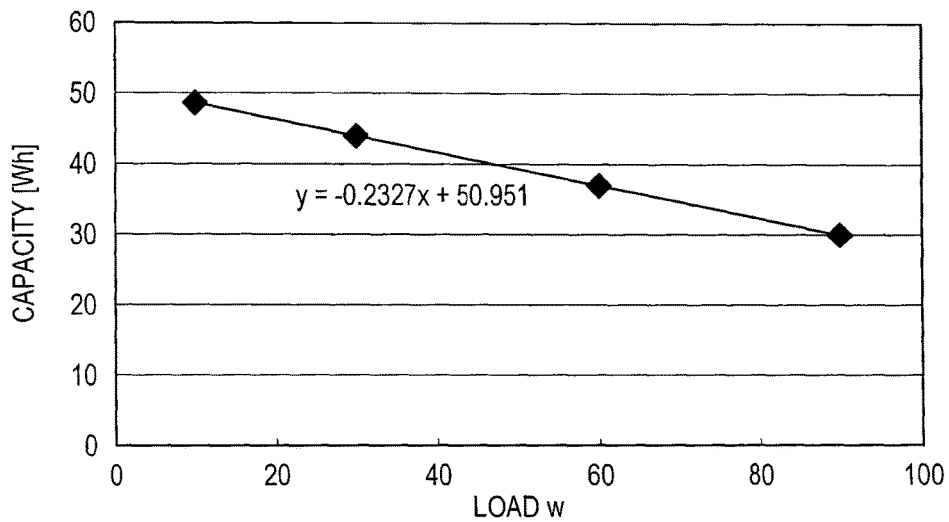
FIG. 29 is a characteristic diagram illustrating the load-capacity characteristic of the information processing apparatus with low battery capacity and high performance.

First, among the line-up of models, the threshold value is calculated from load-capacity characteristic under the environment of a temperature of 20° C., based on load-capacity characteristic (FIG. 29) of the battery 122 in the information processing apparatus 100 having the battery 122 with low capacity and high performance. The power, which is necessary until S0 wakes in Timer Hib of S3, is approximately 10% of the capacity of the battery 122. In addition, as illustrated in FIG. 28, the load at the time of turning hibernation on (power used at the time of transition from S0 to S4) is approximately 15% of the battery capacity. FIG. 28 is a schematic diagram illustrating the load at the time of turning hibernation on (the amount of reduced capacity of the battery 122 in hibernation) in each of a plurality of different USB loads. In addition, a margin defined by considering temperature characteristics is set to 5% of the battery capacity. As a result, it is preferable to set the remaining capacity of approximately 30% of the battery capacity that is the sum of 10%, 15%, and 5% as a threshold value.

In addition, if a threshold value is specified in units of [mWh], the threshold value will have a relatively high value for a model with a low battery capacity. In each model, a battery is selected to have capacity that can support the PC performance (load power), and thus it is preferable to determine a specified value in units of [%] as the units of threshold value so that a threshold value is to be uniform for all the models.

As described above, with the temporary stop mechanism according to the present embodiment, when power is supplied by DC, during S3, and the remaining battery capacity falls below 30%, the USB charging is temporarily stopped, and thus the occurrence of data loss can be reliably prevented.

4.4. Hybrid Sleep Function

Next, as another measure against data loss, an overview of a hybrid sleep function is described. Here, an image is saved in hybrid sleep or in hibernation by the BIOS and the power source other than the power source of the memory 109 is turned off in S3 state, and thus the retention of battery capacity in DC power mode is facilitated.

Here, hybrid sleep is S3 state in which Hib image is created as described above and is intended to create a hibernation image on the storage device 220 at the same time as the transition to standby.

Figure 30:
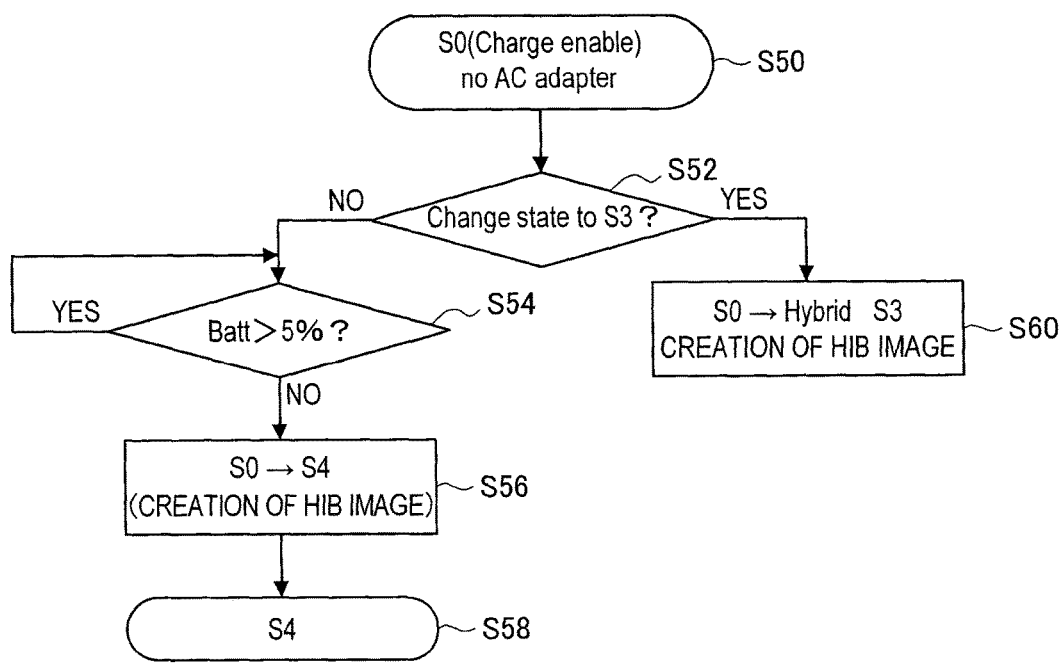
FIG. 30 is a flowchart illustrating a process of a hybrid sleep function.

FIG. 30 is a flowchart illustrating a process of the hybrid sleep function. As illustrated in FIG. 30, in a state where the power is not supplied from AC in S0 state (step S50), if there is an instruction to perform a transition to S3 (step S52), then a transition to hybrid sleep is performed and Hib image is created (step S60).

In addition, if there is no instruction to perform a transition to S3 in step S52, then the process proceeds to step S54, it is determined whether a remaining battery capacity exceeds 5%, so if it is determined that the remaining battery capacity is less than or equal to 5%, then a transition from S0 to S4 is performed and Hib image is created (steps S56 and S58).

As described above, according to the hybrid sleep function, the Hib image is created at the timing of entering S3, resulting in reliable prevention of the occurrence of data loss.

4.5. Battery Sleep Disable (Batt Sleep Disable)

When a state where battery sleep (Batt sleep) is in enable state, the charge and discharge current of a battery is less than or equal to a given current value, and communication with the EC 106 is not performed continues for a predetermined time, the battery 122 enters sleep mode. In this case, a CPU 123 of the battery 122, which detects the amount of electric current, becomes in sleep state. The condition of cancel is when the EC 106 activates a processor.

Measures to prevent damage of the battery is obtained by disabling battery sleep (Batt sleep) during USB charging. If Batt sleep keeps its enable state, when the USB charging begins after entering Batt Sleep, the amount of electric current is not detected because the CPU 123 is not started, resulting in generation of heat in FET.

Figure 31:
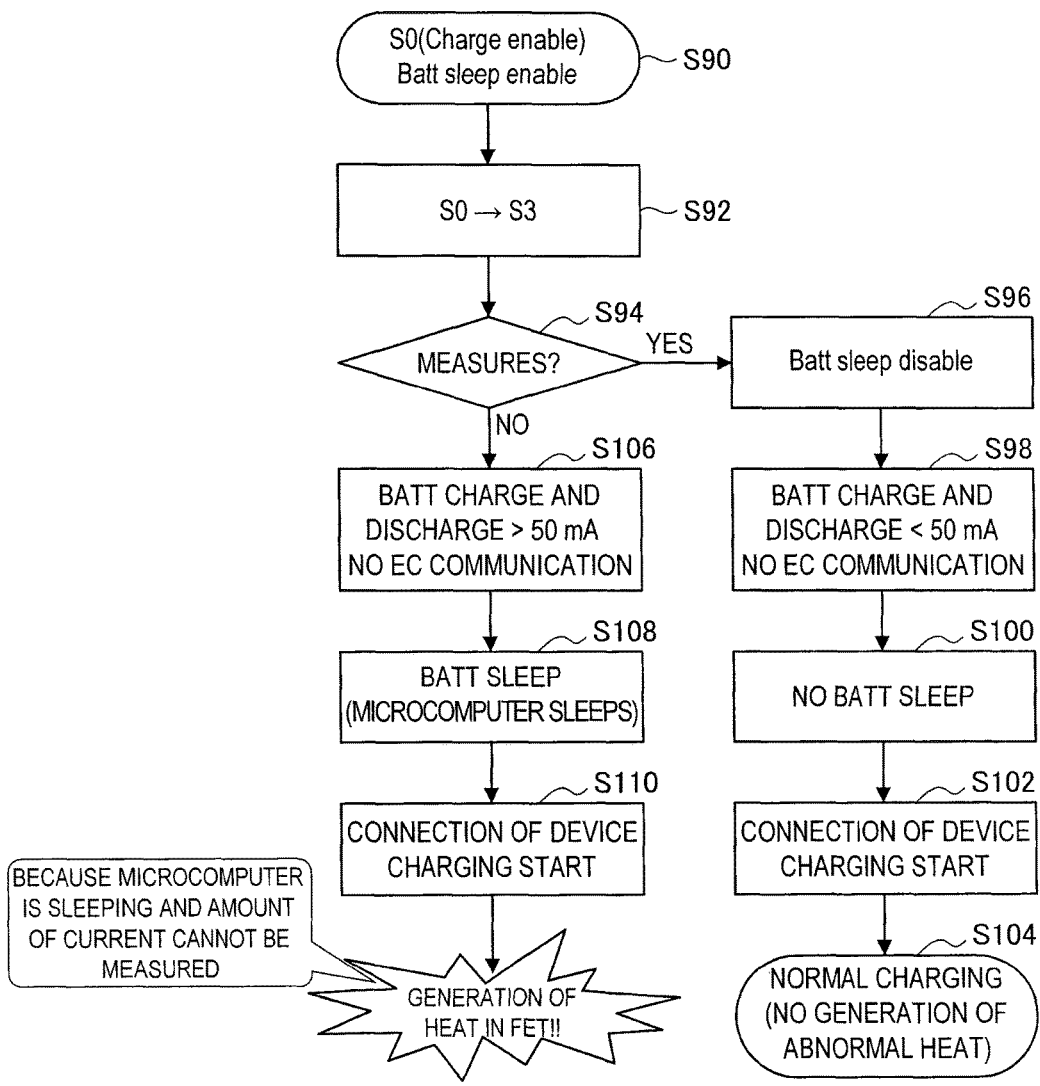
FIG. 31 is a flowchart illustrating a process of battery sleep disable.

FIG. 31 is a flowchart illustrating a process of the battery sleep disable. FIG. 31 shows a case of implementing the measure for the battery sleep disable (step S96 and the subsequent steps) and a case of not implementing the measure (step S106 and the subsequent steps).

When a power source other than the power source of the memory is turned off in S3 (step S92), the battery sleep disable is set regardless of the presence or absence of connection to an AC power source (step S96). In step S100, the battery is not in sleep state and the CPU 123 of the battery 122 is in wake-up state. Thus, when the USB charging is performed (step S102), the occurrence of abnormal heat generation is reliably prevented (step S104). As the condition of disabling, when the USB charging is turned on, both the first and second batteries are disabled. When the USB charging is turned off, only the second battery is disabled and the first battery is enabled.

On the other hand, in the case of not implementing the measure for the battery sleep disable, in step S108, the battery 122 is in sleep state and the CPU 123 is not waked. Thus, in step S10, when the USB charging is performed, the abnormal heat generation occurs.

4.6. Processing of Third Embodiment

Next, processing of the third embodiment is described with reference to block diagrams of FIGS. 32 to 37. FIGS. 32 to 37 illustrate how a charged device 300 to be charged with USB charging is connected to the information processing apparatus 100. The charged device 300 is configured to include a chipset 302, a battery 304, a power switch 306, and a USB connection 308. In addition, the configuration of the information processing apparatus 100 is similar to that illustrated in FIG. 2, but there are illustrated the CPU 123 of the battery 122, a power switch (Power SW) 130 for USB charging, and a USB connection 132, which are not illustrated in FIG. 2. In FIGS. 32 to 37, components marked with dots indicate that the power is not supplied to the components.

Figure 32:
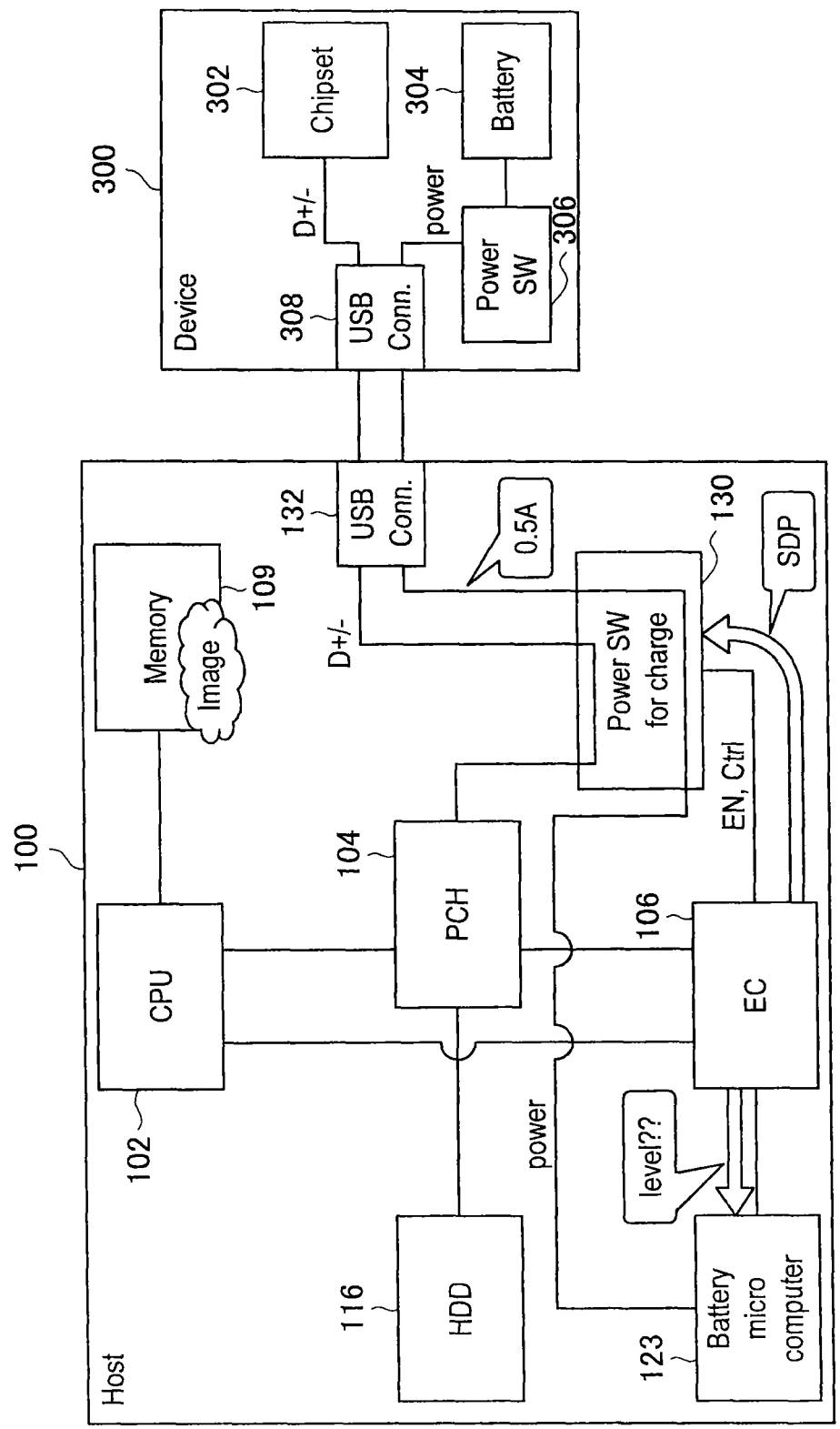
FIG. 32 is a block diagram illustrating a process of the third embodiment.

FIG. 32 illustrates the state where the USB charging is turned off in S0. In this state, all of the components including the processor 102 and the chipset 104 are turned on. An image on a display screen is present on the processor 102, and the EC 106 monitors the remaining capacity of the battery 122. The EC 106 controls a port mode of the power switch 130 for charging. In FIG. 32, the port mode is SDP and can supply up to 0.5 [A] to the charged device 300.

Figure 33:
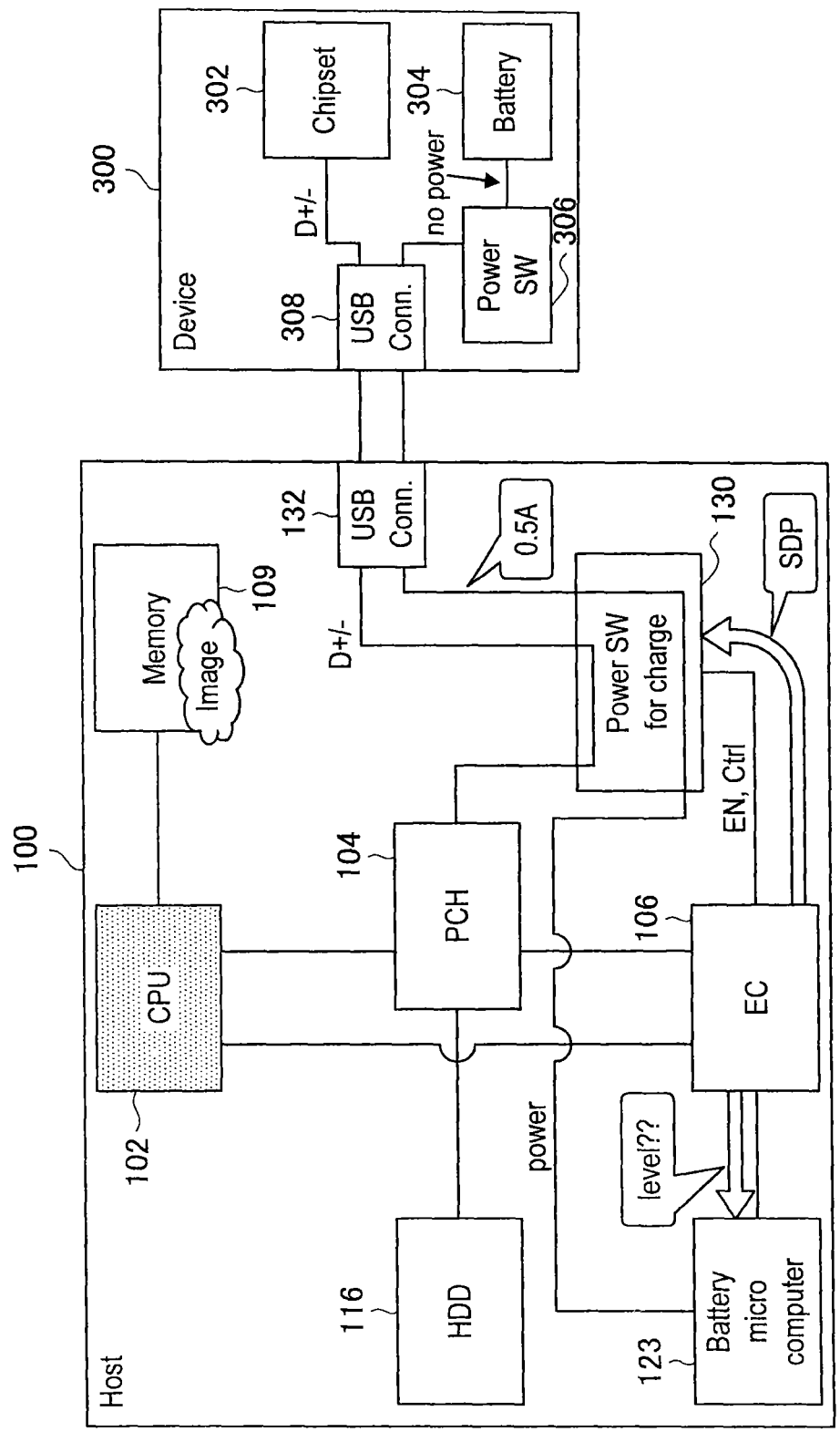
FIG. 33 is a block diagram illustrating a process of the third embodiment.

FIG. 33 shows the state where a transition from S0 to S3 is performed and the USB charging is turned off. In this state, the power source of the processor 102 is turned off and the image is written in the memory 109. In this state, if the reduced remaining capacity of the battery 122 turns the power source off, then the power is not supplied to the memory 109 and thus the image will be lost. The EC 106 monitors the remaining capacity of the battery 122. The port mode remains in SDP state and can supply up to 0.5 [A] to the device.

Figure 34:
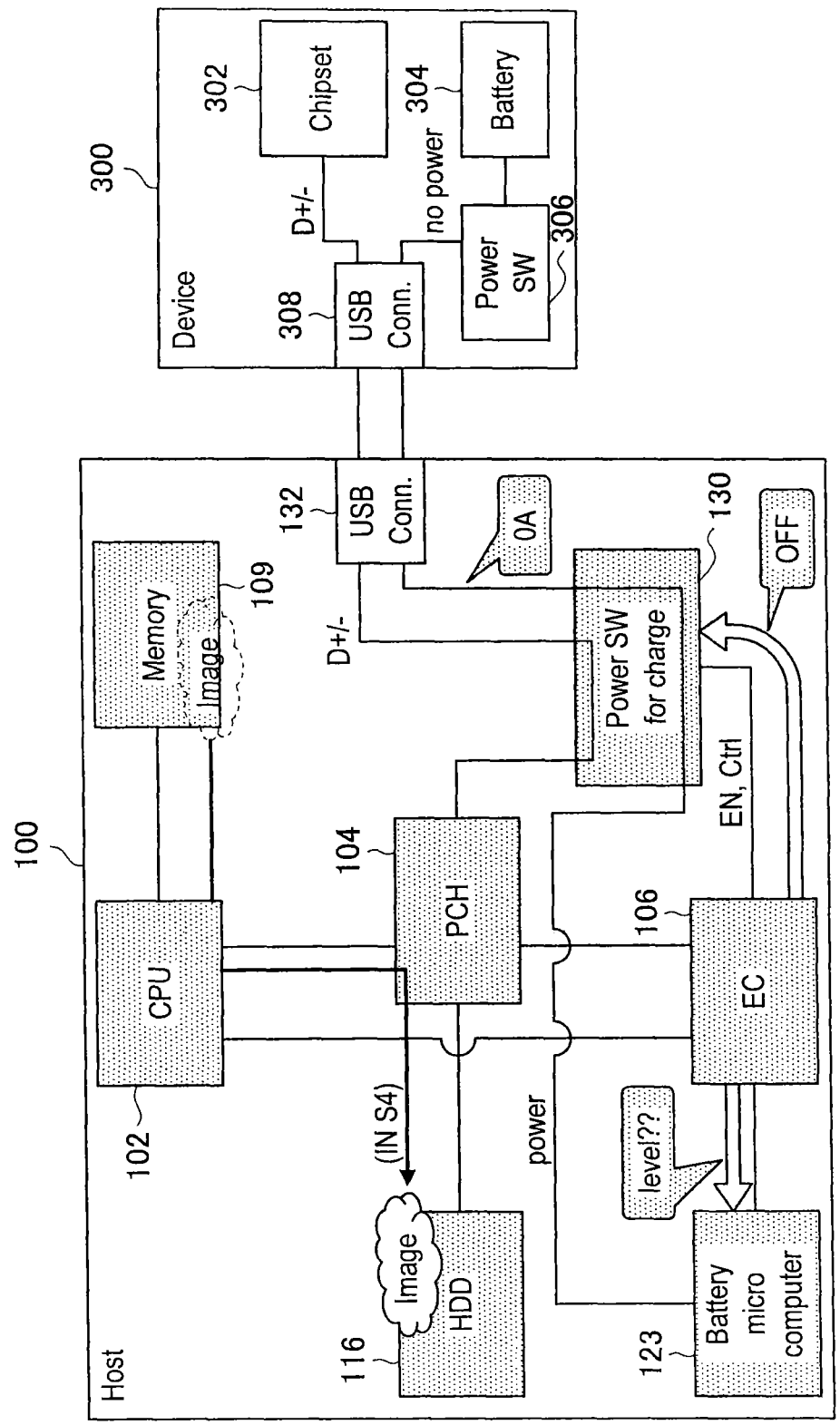
FIG. 34 is a block diagram illustrating a process of the third embodiment.

FIG. 34 shows a state where a transition from S0 to S4 or S5 is performed and the USB charging is turned off. In this state, substantially all of the components are turned off. In S4 state, the image is stored in the HDD 116. In this case, even when the power source is turned off, the image is stored in the HDD 116 and thus there is no possibility that the image is lost. The EC 106 may not monitor the remaining capacity of the battery 122 because its power source is turned off. In addition, the CPU 123 of the battery 122 is in sleep state, and the port mode is turned off. Accordingly, the charged device 300 is not charged.

Figure 35:
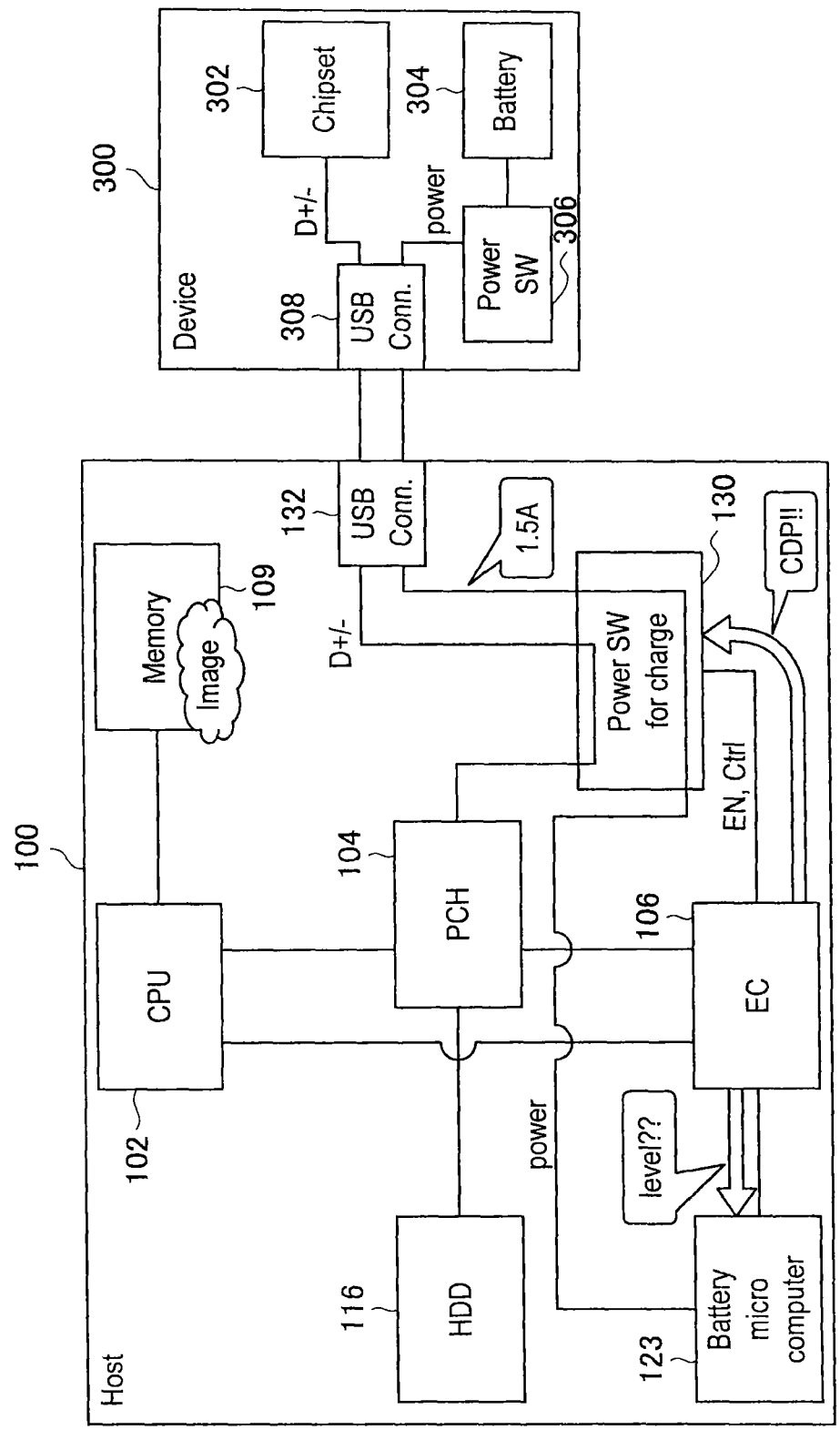
FIG. 35 is a block diagram illustrating a process of the third embodiment.

FIG. 35 shows the state where the USB charging is turned on in S0. In this state, all of the components including the processor 102 and the chipset 104 are turned on. An image is present on the processor 102, and the EC 106 monitors the remaining capacity of the battery 122. The EC 106 controls a port mode of the power switch (Power SW) 130 for charging. The port mode is CDP and can supply up to 1.5 [A] to the charged device 300 to be charged. When the charged device 300 is not supported from CDP, the current of up to 0.5 [A] can be supplied.

Figure 36:
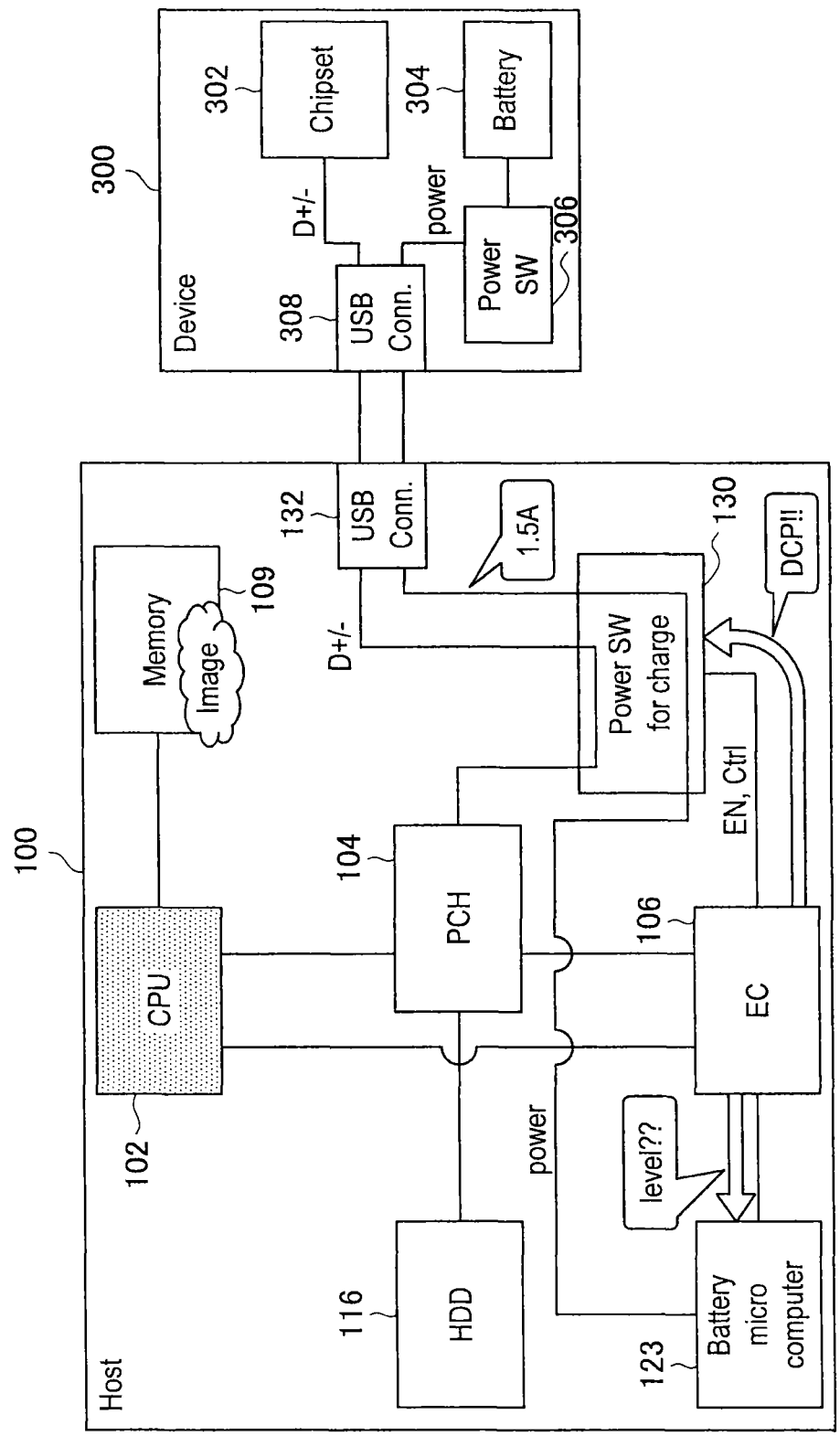
FIG. 36 is a block diagram illustrating a process of the third embodiment.

FIG. 36 shows a state where a transition from S0 to S3 is performed, and the USB charging is turned on. In this state, the processor 102 is turned off, and the image is written in the memory 109. In this state, if the reduced remaining capacity of the battery 122 turns the power source off, then the image will be lost. The EC 106 monitors the remaining capacity of the battery 122. The port mode is DCP and can supply up to 1.5 [A] to the device.

Figure 37:
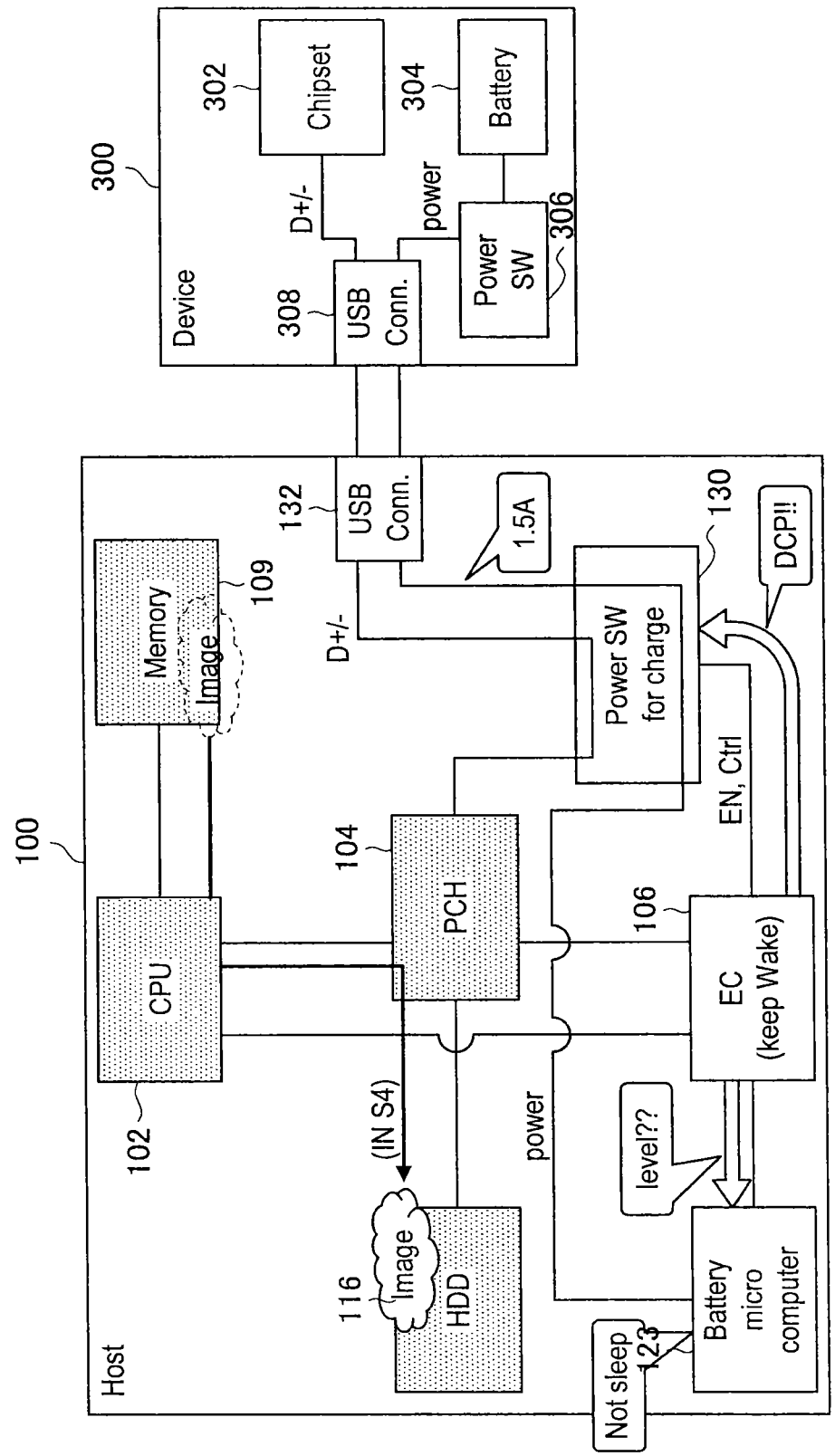
FIG. 37 is a block diagram illustrating a process of the third embodiment.

FIG. 37 shows a state where a transition from S0 to S4 or S5 is performed and the USB charging is turned on. In the state where the USB charging is turned on, the power source of the EC 106 is maintained. In S4, the image is stored in the HDD 116. In this case, even when the power source is turned off, the image is stored in the HDD 116 and thus there is no possibility that the image is lost. The EC 106 monitors the remaining capacity of the battery 122. The CPU 123 of the battery 122 is not in sleep state, and the port mode becomes DCP.

According to the third embodiment as described above, it is possible to reliably prevent data loss due to the reduction in battery capacity.

5. Fourth Embodiment

Next, a fourth embodiment of the present disclosure is described. The fourth embodiment is intended to improve the usability of the user in BIOS hibernation.

<Cancellation of Hibernation>

As described above, in hibernation, the contents of the memory is stored (saved) in the storage device 116 such as an HDD immediately before the power source of the system is turned off. In this case, depending on the usage of the system memory 109 or the performance of the storage device 116, it may take time to write the BIOS hibernation data and it is not possible to interrupt the process. In some cases, it takes more than one minute to write the data.

Thus, in the present embodiment, an interrupt handler of the power button 124 is prepared by BIOS, and if the power button 124 is pressed, hibernation is cancelled. When the hibernation is cancelled, the writing of hibernation data is interrupted, and the system is returned to S0. The EC 106 detects that the power button 124 is pressed, and accordingly interrupts the system.

The cancellation, when the power button is pressed while the BIOS hibernation data is written, is a function of stopping the writing and then immediately returning. This function allows the user not to wait for the completion of writing the BIOS hibernation data when it is intended to return while the BIOS hibernation data is written, thereby improving the usability of the user.

In addition, as will be described later, during the writing of the BIOS hibernation data, an access lamp is turned off, the user who wants to return is naturally induced to depress the power button 124 and can use the cancellation function without particular consciousness.

<Turn Off Lamp During Hibernation>

In addition, during the writing of the BIOS hibernation data, the system is in S0 state, and a power LED (a power lamp) 126 or an access LED (a disk access lamp) 118 is turned on, and thus it is necessary for the user to wait until the lighting is turned off. During this time, it is assumed that the user mistakes the lighting for Hybrid Sleep or erroneously recognizes the memory as it is dumped due to any system errors.

Thus, in the present embodiment, a command OF for override control of a lighting state of the power LED 126 or the access LED 118 between the BIOS 103 and the EC 106 is prepared. The BIOS 103 requests the EC 106 to turn off the lamp before the writing of the BIOS hibernation data.

In this way, in the present embodiment, it is not necessary for the user to be aware of the time taken in writing the BIOS hibernation data, and thus the lamp is turned off. Accordingly, even when it takes a slightly long time to write the BIOS hibernation data, the user will not erroneously recognize the system as it freezes. In addition, without causing the user to be aware of the cancellation function, it is possible to make the user recognize that the system is in the state that can return to S0 by pressing the power button 124. In other words, if the power LED 126 is turned off, the system is viewed as if it is in off state, and thus the user is naturally induced to press the power button 124 when the user tries to turn on the power source.

<How to Cope with Case where System Freezes During Writing of Hibernation Data>

When the writing of the BIOS hibernation data is started, the power LED 126 and the access LED 118 are turned off, and if, for example, the system freezes during the writing of the BIOS hibernation data, then the user is incapable of recognizing its state using the lighting of a lamp.

Thus, the process of turning off the lamp intentionally is prevented from being performed by implementing a function to ignore the instruction of the EC 106 to cause the BIOS to turn off when the power button 124 is pressed. If the system freezes, the lamp is turned on while the system remains unreturned, and thus this can tell the user any abnormal state.

<Process Procedure>

Figure 38:
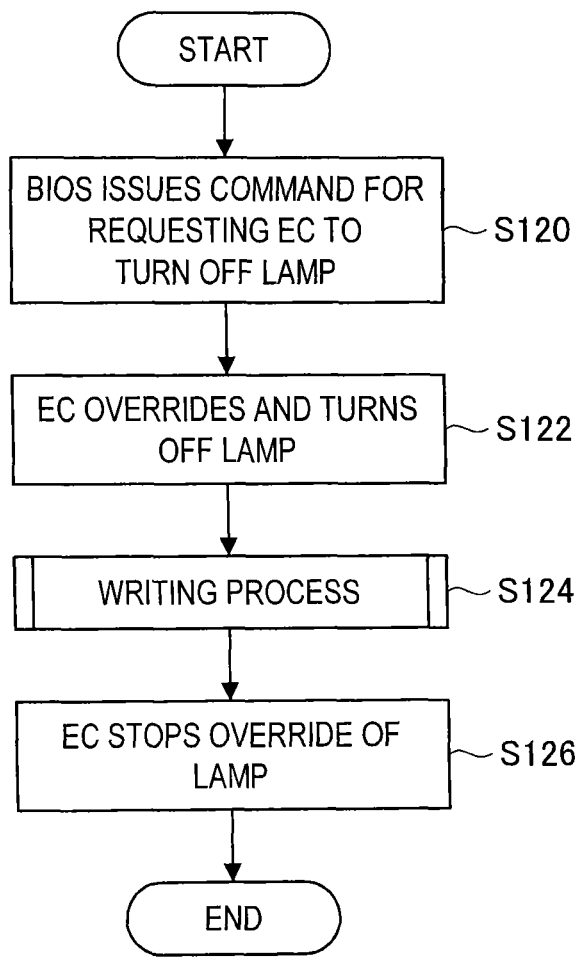
FIG. 38 is a flowchart illustrating a process of a fourth embodiment.

FIG. 38 is a flowchart illustrating a process procedure of the present embodiment. First, in step S120, the BIOS 103 issues a command that requests the EC 106 to turn off the lamp. Next, in step S122, the EC 106 overrides the lamp to turn off. Then, in step S124, the process of writing to the storage device 116 in hibernation is performed. Then, in step S126, the EC 106 stops the override of the lamp.

Figure 39:
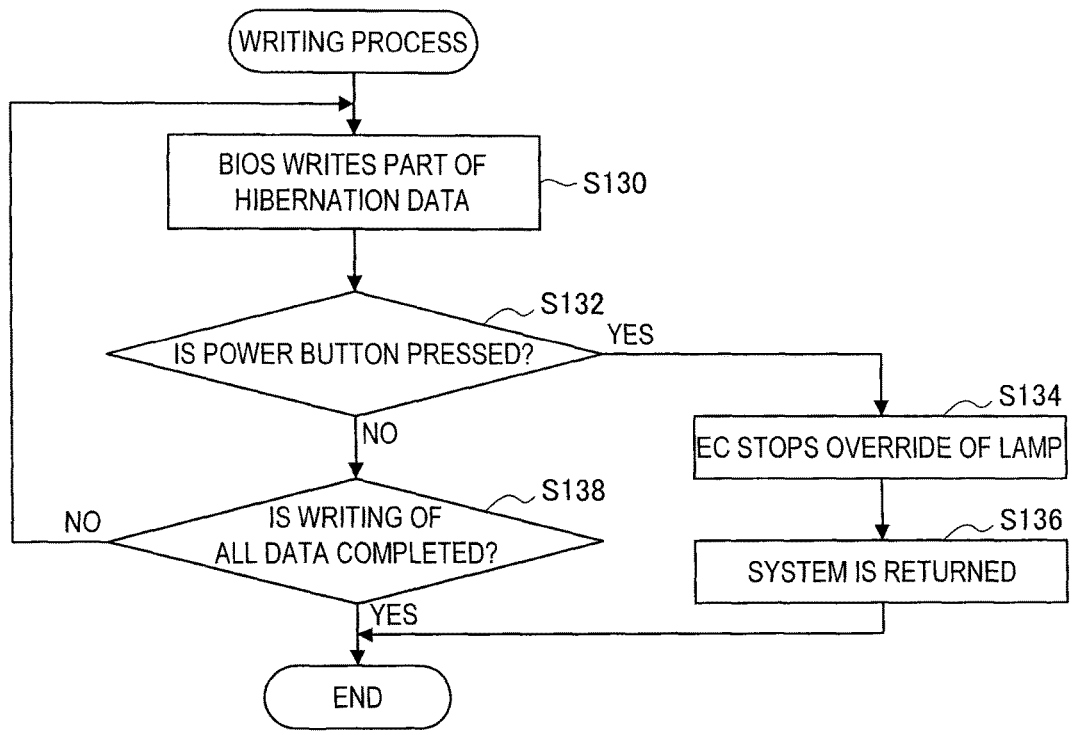
FIG. 39 is a flowchart illustrating a process of the fourth embodiment.

FIG. 39 is a flowchart illustrating the writing process. First, in step S130, the BIOS 103 performs the writing of a part of hibernation data. Next, in step S132, it is determined whether the power button 124 is pressed or not. If it is determined that the power button 124 is pressed, then the process proceeds to step S134. In step S134, the EC 106 stops the override of the lamp, and in the next step S136, the system is returned.

If it is determined that the power button 124 is not pressed in step S132, then the process proceeds to step S138, and it is determined whether the writing of all data is completed or not. If it is determined that the writing is completed, the process ends (RETURN). If it is determined that the writing is not completed, the process returns to step S130.

According to the fourth embodiment as described above, when the power button 124 is pressed, hibernation is cancelled, and thus the usability of the user can be improved. In addition, the lamp is turned off before the writing of the BIOS hibernation data, and thus even when it takes a slightly long time to write the BIOS hibernation data, the user will not erroneously recognize the system as it freezes. In addition, the user can recognize as the state which can perform cancellation using the power button 124 to return to S0.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)
An information processing apparatus including:
a processor configured to control a system of the information processing apparatus;
a power source controller configured to perform control of power supply to the system and to turn off a power source of the power source controller in standby mode in which a power source of the processor is turned off;
a memory configured to store information in standby mode; and
a power supply unit configured to perform power supply to the memory in standby mode.

(2)
The information processing apparatus according to (1), wherein the power supply unit includes a GPIO expander.

(3)
The information processing apparatus according to (1), wherein the power source supply unit includes a latch circuit.

(4)
The information processing apparatus according to (1), wherein the power source controller includes a region for an operation in a first power source system and a region for an operation in a second power source system, and the region for an operation in the second power source system is turned off in standby mode,
wherein the power supply unit operates in the first power system in standby mode.

(5)
An information processing control method including:
turning off a power source of a power source controller in standby mode in which a power source of a processor is turned off, the power source controller being configured to perform control of power supply to a system of an information processing apparatus, the processor being configured to control the system; and
performing power supply to a memory by a power supply unit in standby mode, the memory being configured to store information, the power supply unit being provided separately from the power source controller.

(6)
A program for causing a computer to function as:
means for turning off a power source of a power source controller in standby mode in which a power source of a processor is turned off, the power source controller being configured to perform control of power supply to a system of an information processing apparatus, the processor being configured to control the system; and
means for causing a power supply unit provided separately from the power source controller to perform power supply to a memory for storing information in standby mode.

REFERENCE SIGNS LIST

100 information processing apparatus
102 processor
106 EC
109 memory
110 GPIO expander
130 latch circuit

The invention claimed is:

1. An information processing apparatus comprising:
a processor configured to control a system of the information processing apparatus;
a power source controller configured to perform control of power supply to the system and to turn off a power source of the power source controller in standby mode in which power of the processor is turned off and in which at least one function of the power source controller is turned off;
a memory configured to store information in standby mode;
a memory controller configured to control the memory, a power source of the memory controller being turned off in standby mode;
a power supply configured to supply power to the memory in standby mode,
wherein the power source controller includes a region that draws power from a first power source system and a region that draws power from a second power source system, and the region that draws power from the second power source system includes functions of the power source controller that are turned off in standby mode, and
wherein the power supply draws power from the first power source system to supply power to the memory in standby mode; and
a chipset including an independently powered Real-Time-Clock (RTC) that sets a wake time to turn on the processor, wherein
the processor obtains the set wake time when the RTC sets the wake time,
the processor transmits the set wake time to the power source controller,
the power source controller is configured to set an internal wake time prior to the set wake time,
the power source of the power source controller is turned off in standby mode until the internal wake time, and
the power source controller turns on a power source of the chipset at a time before the set wake time.

2. The information processing apparatus according to claim 1, wherein the power supply includes a GPIO expander.

3. The information processing apparatus according to claim 1, wherein the power supply includes a latch circuit.

4. An information processing control method comprising:
turning off a power source of a power source controller in standby mode in which power of a processor is turned off and in which at least one function of the power source controller is turned off, the power source controller being configured to perform control of power supply to a system of an information processing apparatus, the processor being configured to control the system;

turning off a power source of a memory controller in standby mode, the memory controller being configured to control a memory;

supplying power to the memory by a power supply in standby mode, the memory being configured to store information, the power supply being provided separately from the power source controller, wherein the power source controller includes a region that draws power from a first power source system and a region that draws power from a second power source system, and the region that draws power from the second power source system includes functions of the power source controller that are turned off in standby mode, wherein the power supply draws power from the first power source system to supply power to the memory in standby mode, and wherein a chipset includes an independently powered Real-Time-Clock (RTC) that sets a wake time to turn on the processor;

obtaining, by the processor, the set wake time when the RTC sets the wake time;

transmitting, by the processor, the set wake time to the power source controller;

setting, by the power source controller, an internal wake time prior to the set wake time, turning off the power source of the power source controller in standby mode until the internal wake time; and turning on a power source of the chipset, by the power source controller, at a time before the set wake time.

5. A non-transitory computer-readable storage medium storing computer-readable instructions thereon, which, when executed by a computer, cause the computer to perform an information processing control method comprising:

turning off a power source of a power source controller in standby mode in which power of a processor is turned off and in which at least one function of the power source controller is turned off, the power source controller being configured to perform control of power supply to a system of an information processing apparatus, the processor being configured to control the system;

turning off a power source of a memory controller in standby mode, the memory controller being configured to control a memory;

causing a power supply provided separately from the power source controller to supply power to a memory for storing information in standby mode, wherein the power source controller includes a region that draws power from a first power source system and a region that draws power from a second power source system, and the region that draws power from the second power source system includes functions of the power source controller that are turned off in standby mode, wherein the power supply draws power from the first power source system to supply power to the memory in standby mode, and wherein a chipset includes an independently powered Real-Time-Clock (RTC) that sets a wake time to turn on the processor;

obtaining, by the processor, the set wake time when the RTC sets the wake time;

transmitting, by the processor, the set wake time to the power source controller;

setting, by the power source controller, an internal wake time prior to the set wake time, turning off the power source of the power source controller in standby mode until the internal wake time; and turning on a power source of the chipset, by the power source controller, at a time before the set wake time.

6. The information processing apparatus according to claim 1, wherein the power source controller turns on the power source of the chipset immediately before the set wake time.

7. The information processing apparatus according to claim 1, wherein the power source of the chipset is turned off in the standby mode until the power source controller turns on the power source of the chipset at the time before the set wake time.

* * * * *